United States Patent
Kanaguchi et al.

(10) Patent No.: US 10,741,110 B2
(45) Date of Patent: Aug. 11, 2020

(54) VEHICULAR DISPLAY SYSTEM

(71) Applicant: HONDA MOTOR CO., LTD., Tokyo (JP)

(72) Inventors: Yutaka Kanaguchi, Wako (JP); Ichiro Shibata, Shizuoka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 16/125,972

(22) Filed: Sep. 10, 2018

(65) Prior Publication Data
US 2019/0080637 A1 Mar. 14, 2019

(30) Foreign Application Priority Data
Sep. 11, 2017 (JP) ................................. 2017-174406

(51) Int. Cl.
| | | |
|---|---|---|
| G09F 21/04 | (2006.01) | |
| B60Q 1/26 | (2006.01) | |
| B60Q 1/32 | (2006.01) | |
| B60R 1/00 | (2006.01) | |
| G09F 13/02 | (2006.01) | |

(Continued)

(52) U.S. Cl.
CPC ............ *G09F 21/048* (2013.01); *B60Q 1/24* (2013.01); *B60Q 1/2619* (2013.01); *B60Q 1/2657* (2013.01); *B60Q 1/2661* (2013.01); *B60Q 1/2665* (2013.01); *B60Q 1/2684* (2013.01); *B60Q 1/30* (2013.01); *B60Q 1/302* (2013.01); *B60Q 1/323* (2013.01); *B60Q 1/503* (2013.01); *B60R 1/00* (2013.01); *G09F 9/302* (2013.01); *G09F 13/02* (2013.01); *G09G 3/36* (2013.01); *B60J 1/00* (2013.01); *B60J 7/08* (2013.01); *G09G 2360/144* (2013.01); *G09G 2380/10* (2013.01); *H04N 7/181* (2013.01)

(58) Field of Classification Search
CPC ...... B60J 1/00; B60J 7/08; B60Q 1/24; B60Q 1/2619; B60Q 1/2657; B60Q 1/2661; B60Q 1/2665; B60Q 1/2684; B60Q 1/30; B60Q 1/302; B60Q 1/323; B60Q 1/503; B60R 1/00; G09F 13/02; G09F 21/048; G09F 9/302; G09G 2360/144; G09G 2380/10; G09G 3/36; H04N 7/181
See application file for complete search history.

(56) References Cited

U.S. PATENT DOCUMENTS

| | | | | | |
|---|---|---|---|---|---|
| 4,711,544 A | * | 12/1987 | Iino | ......................... | G02B 27/01 353/14 |
| 5,518,561 A | * | 5/1996 | Rosa | ........................ | G09F 13/22 156/277 |

(Continued)

FOREIGN PATENT DOCUMENTS

JP  2015-085836 A  5/2015

*Primary Examiner* — Peter D Le
(74) *Attorney, Agent, or Firm* — Rankin, Hill & Clark LLP

(57) ABSTRACT

A vehicular outer panel is provided that is capable of displaying an image or a video which is easily viewed even outdoors under direct sunlight for people outside the vehicle. The vehicular outer panel includes: a transparent plate that is attached to a vehicle and constitutes an outer wall of a vehicle body; and a reflective display unit that is provided on an inner surface, in the inside/outside direction of the vehicle, of the transparent plate and is capable of displaying an image or a video for people outside the vehicle.

9 Claims, 25 Drawing Sheets

(51) Int. Cl.
*G09F 9/302* (2006.01)
*G09G 3/36* (2006.01)
*B60Q 1/30* (2006.01)
*B60Q 1/24* (2006.01)
*B60Q 1/50* (2006.01)
*H04N 7/18* (2006.01)
*B60J 7/08* (2006.01)
*B60J 1/00* (2006.01)

(56) References Cited

U.S. PATENT DOCUMENTS

| | | | | |
|---|---|---|---|---|
| 5,825,281 | A * | 10/1998 | McCreary | B60Q 1/2611 340/425.5 |
| 6,124,647 | A * | 9/2000 | Marcus | B60C 23/0401 307/10.1 |
| 6,854,785 | B2 * | 2/2005 | Simon | B60J 5/0416 296/146.7 |
| 8,670,035 | B2 * | 3/2014 | Robert | B60R 1/00 348/148 |
| 2002/0159270 | A1 | 10/2002 | Lynam | B60K 35/00 362/492 |
| 2003/0043480 | A1 * | 3/2003 | Burgner | B60R 1/12 359/844 |
| 2004/0189947 | A1 * | 9/2004 | Hattori | B60R 11/0235 353/13 |
| 2004/0231208 | A1 * | 11/2004 | Pitt | G09F 21/04 40/590 |
| 2005/0024293 | A1 * | 2/2005 | Sakata | H01L 51/5262 345/30 |
| 2006/0143957 | A1 * | 7/2006 | Salehi | G09F 19/18 40/590 |
| 2006/0207141 | A1 * | 9/2006 | Pitt | G09F 21/04 40/590 |
| 2007/0146481 | A1 * | 6/2007 | Chen | B60R 1/12 348/148 |
| 2009/0015736 | A1 * | 1/2009 | Weller | B60R 1/12 349/11 |
| 2009/0132130 | A1 * | 5/2009 | Kumon | B60K 35/00 701/49 |
| 2009/0243824 | A1 * | 10/2009 | Peterson | B60R 1/12 340/435 |
| 2010/0066925 | A1 * | 3/2010 | Nagahara | G02B 27/01 349/11 |
| 2010/0097448 | A1 * | 4/2010 | Gilbert | B60K 35/00 348/51 |
| 2010/0253597 | A1 * | 10/2010 | Seder | B60R 1/00 345/7 |
| 2010/0289634 | A1 * | 11/2010 | Ikeda | B60Q 9/005 340/441 |
| 2010/0289995 | A1 * | 11/2010 | Hwang | B60R 1/00 349/114 |
| 2011/0115990 | A1 * | 5/2011 | Bhaktiar | B60R 11/0235 348/794 |
| 2012/0262288 | A1 * | 10/2012 | Moussa | B60Q 1/2665 340/475 |
| 2013/0176335 | A1 * | 7/2013 | Sugiyama | B60K 35/00 345/633 |
| 2014/0191942 | A1 * | 7/2014 | Kobayashi | G02B 27/0172 345/156 |
| 2014/0285666 | A1 * | 9/2014 | O'Connell | B60R 1/12 348/148 |
| 2015/0009163 | A1 * | 1/2015 | Nakai | G01C 21/3664 345/173 |
| 2015/0062141 | A1 * | 3/2015 | Hayasaka | B60R 1/00 345/581 |
| 2016/0170487 | A1 * | 6/2016 | Saisho | G01C 21/3635 345/156 |
| 2016/0280136 | A1 * | 9/2016 | Besson | B60R 1/00 |
| 2016/0355133 | A1 * | 12/2016 | Kim | G02B 27/01 |
| 2016/0379422 | A1 * | 12/2016 | Kahn | G01D 7/00 701/36 |
| 2017/0011709 | A1 * | 1/2017 | Kuwabara | B60K 35/00 |
| 2017/0057430 | A1 * | 3/2017 | Kim | B60R 13/00 |
| 2018/0231772 | A1 * | 8/2018 | Han | G02B 27/0101 |
| 2019/0299784 | A1 * | 10/2019 | Nakano | B60W 50/14 |
| 2019/0318609 | A1 * | 10/2019 | Obayuwana | G08B 25/016 |
| 2019/0384060 | A1 * | 12/2019 | Naruse | G09G 5/10 |

* cited by examiner

FIG. 2
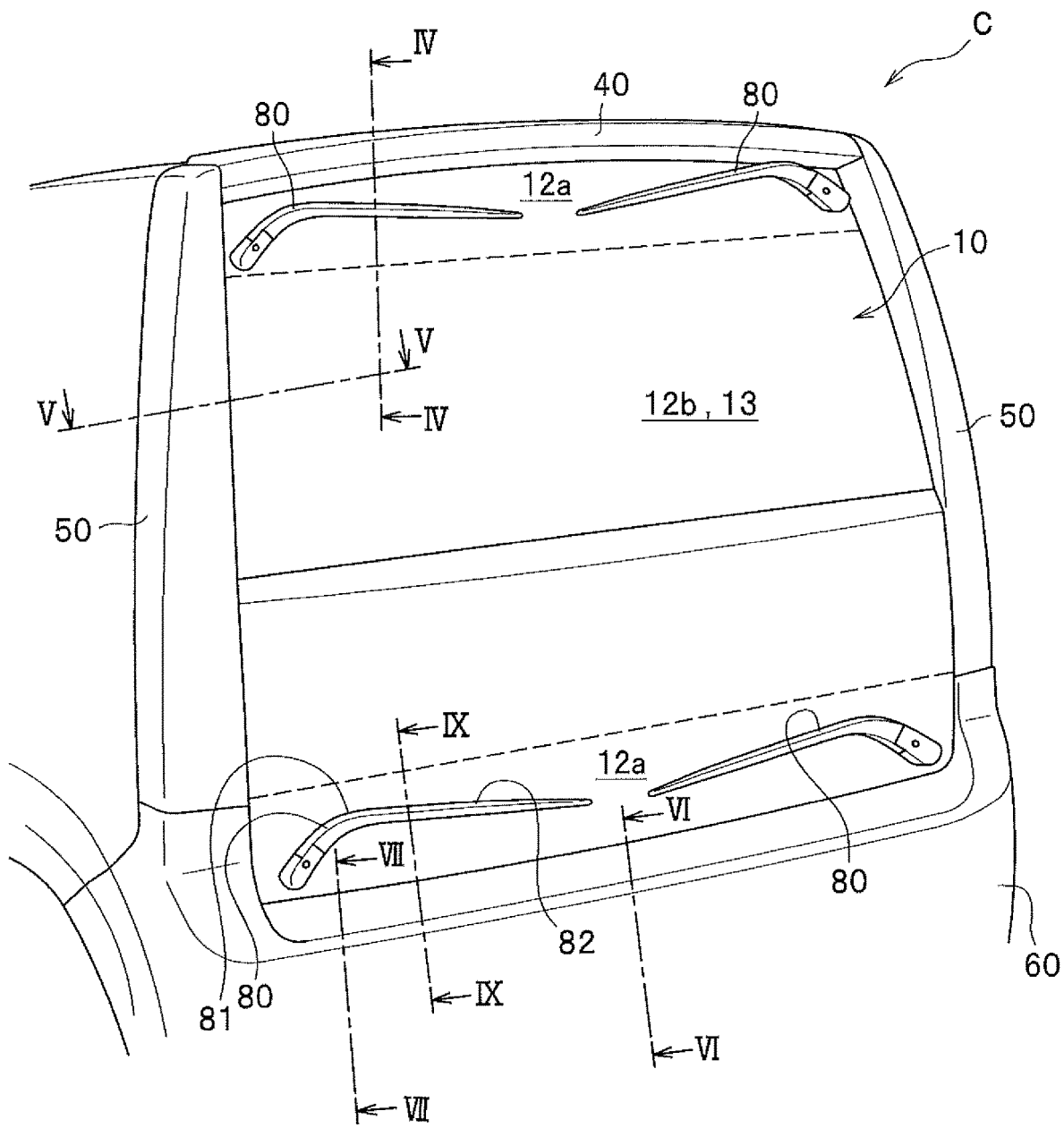
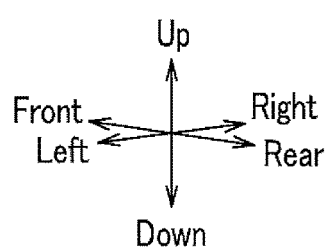

FIG. 3
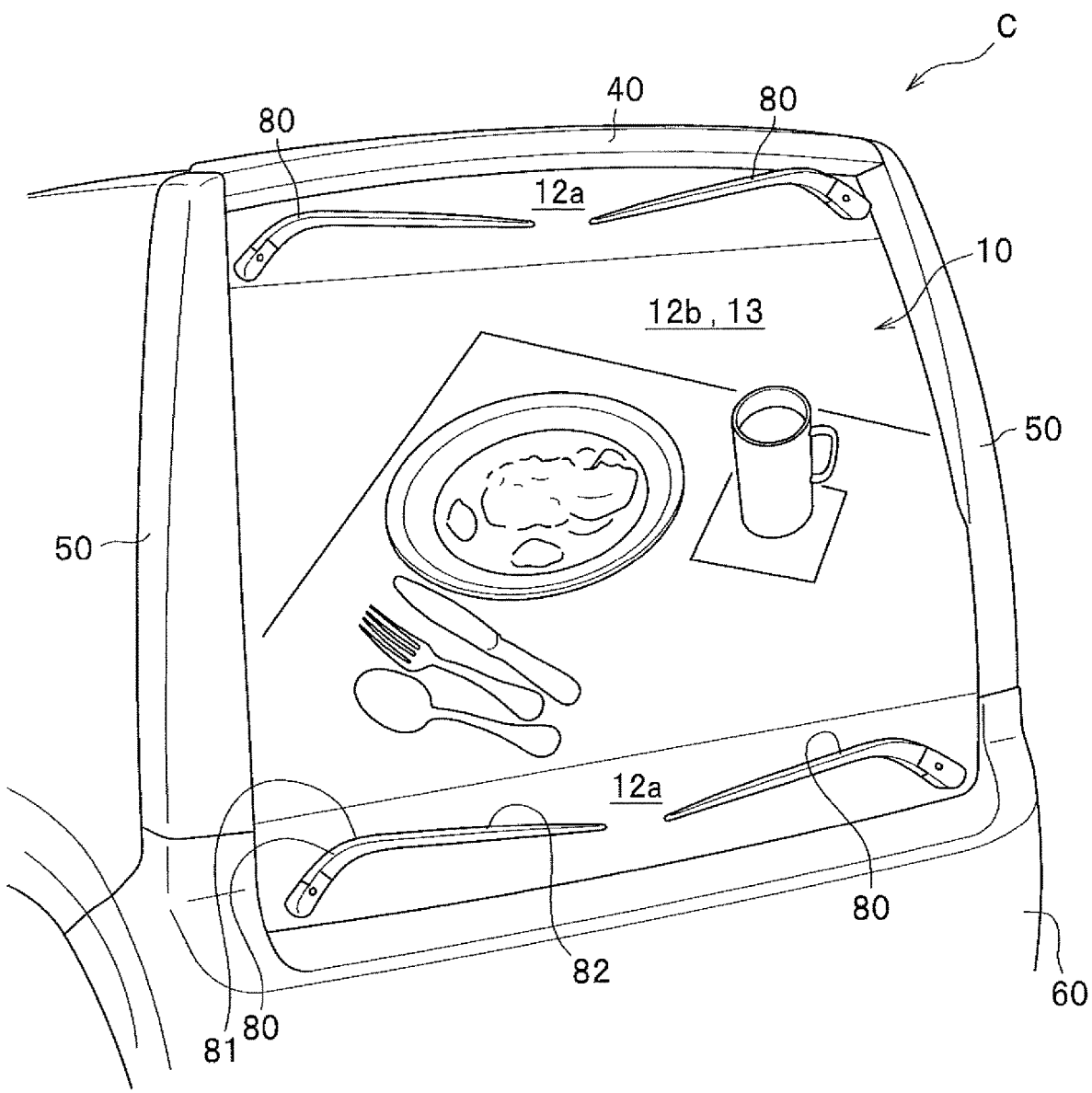
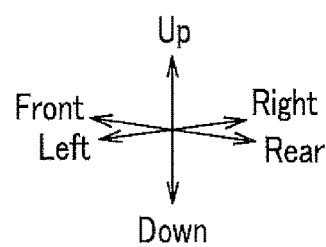

FIG. 8
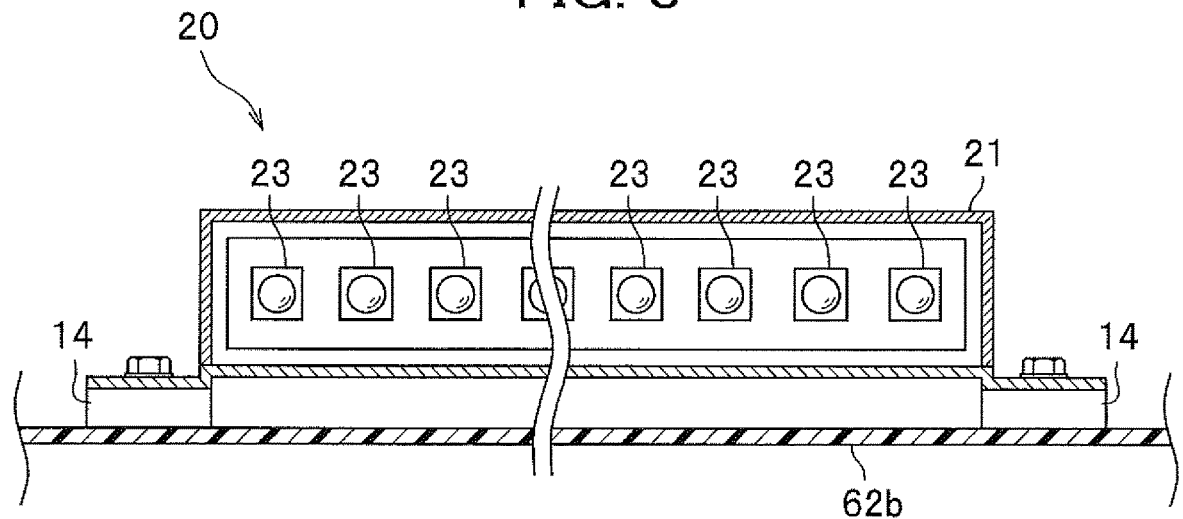
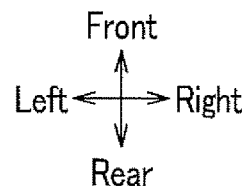

FIG. 16
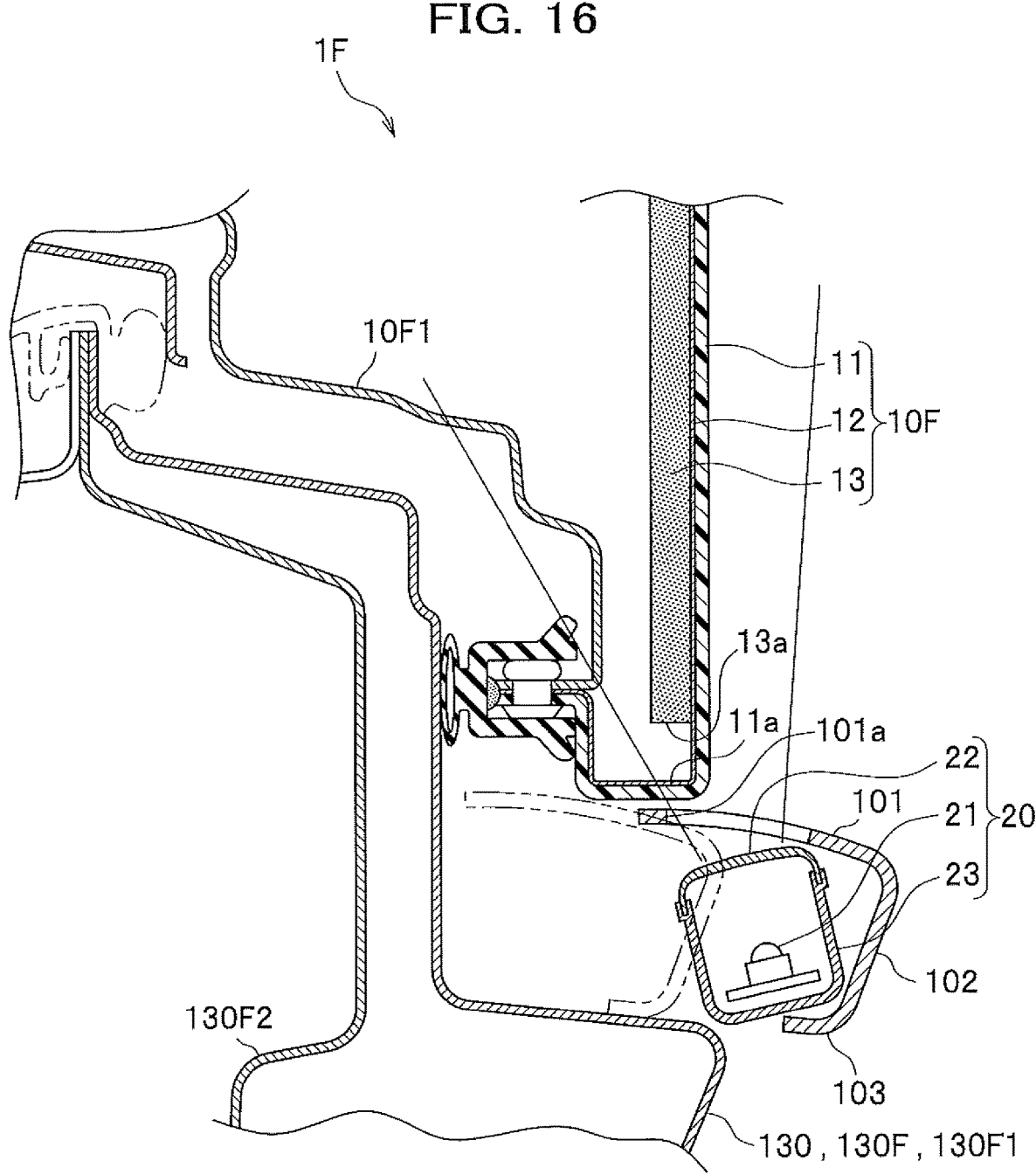
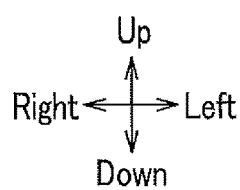

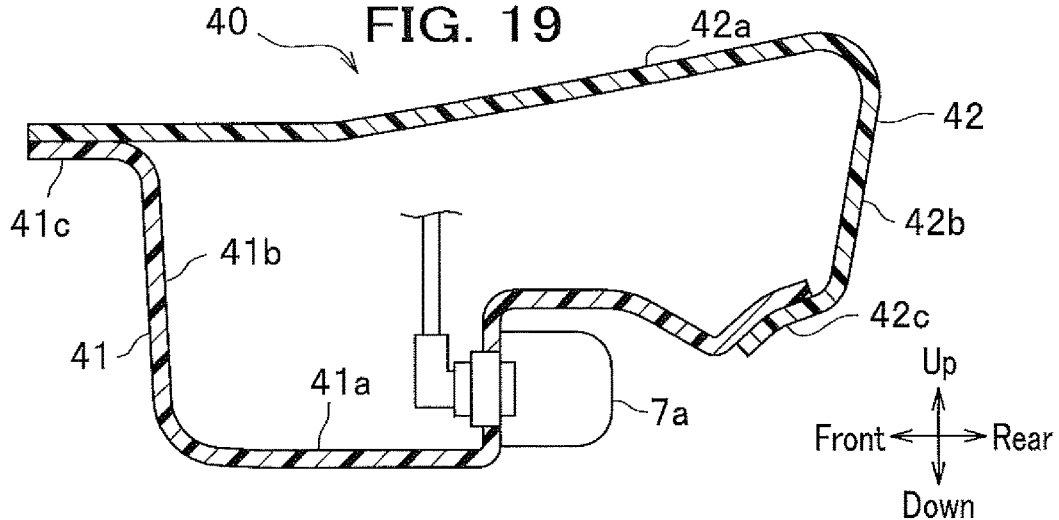
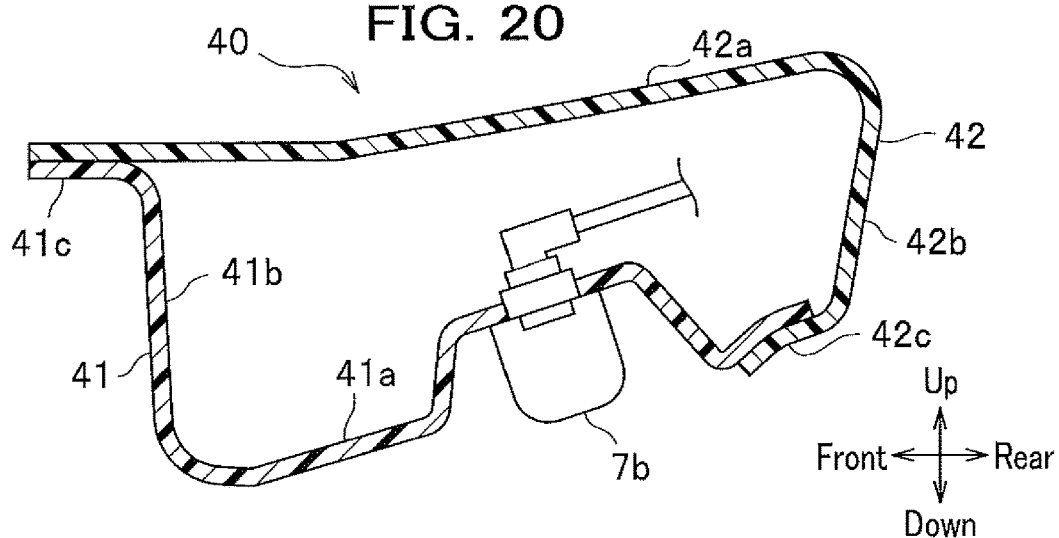
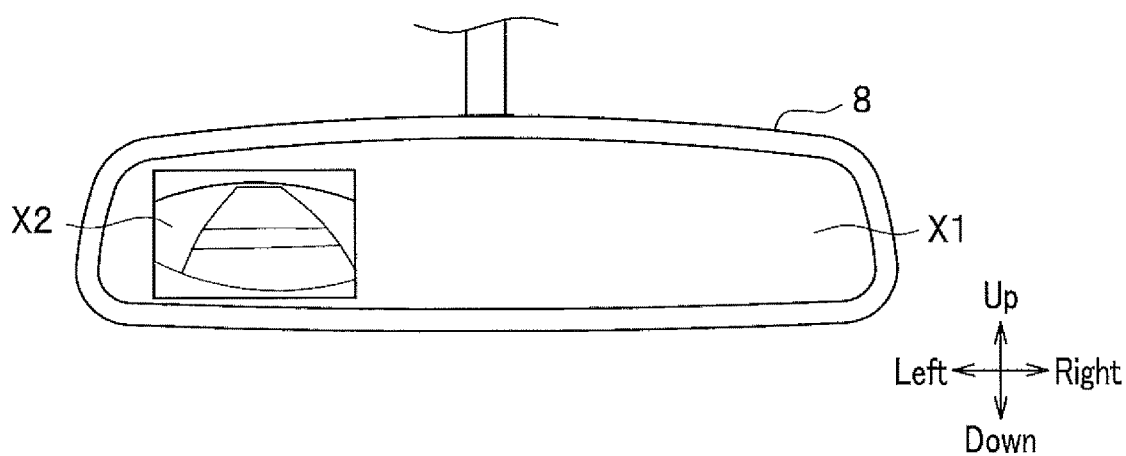

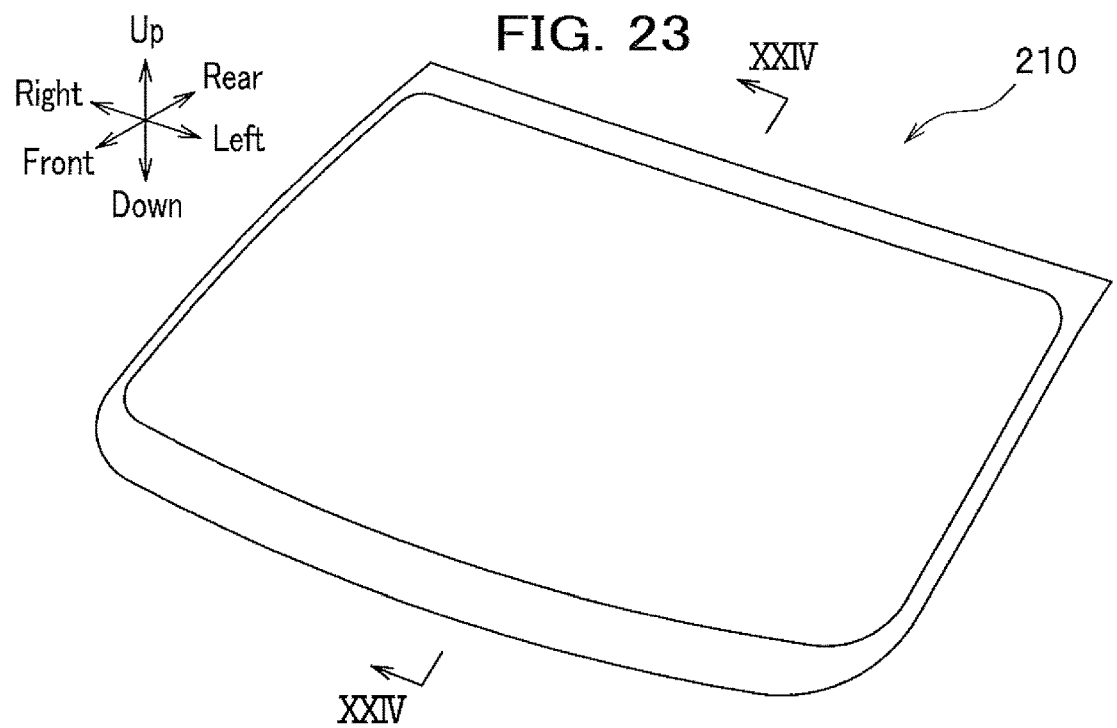
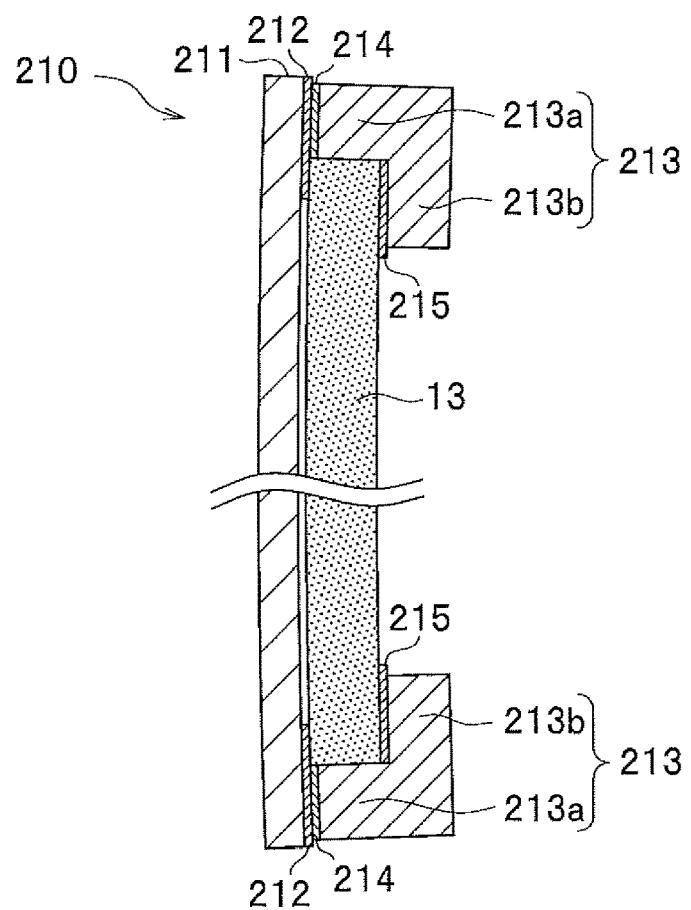

VEHICULAR DISPLAY SYSTEM

CROSS-REFERENCE TO RELATED APPLICATION

This application claims the benefit of priority to Japanese Patent Application No. 2017-174406 filed 11 Sep. 2017, the disclosures of all of which are hereby incorporated by reference in their entireties.

TECHNICAL FIELD

The present invention relates to a vehicular outer panel, a vehicular display curtain, a vehicular display convertible top, and a vehicular display system.

BACKGROUND OF THE INVENTION

Japanese Patent Application Publication No. 2015-085836A describes a technique of projecting an image visible from outside to a body of an automobile by a projection unit set up in a window frame of the automobile or the like.

SUMMARY OF THE INVENTION

Problems to be Solved

However, such a technique projects and displays an image on a metallic body, to make the image hardly visible outdoors under direct sunlight.

The present invention has been made in view of the above problem to provide a vehicular outer panel panel, a vehicular display curtain, a vehicular display convertible top, and a vehicular display system that are capable of displaying an image or a video, which is easily viewed even outdoors under direct sunlight, for people outside the vehicle.

Solution to Problem

In order to solve the above-mentioned problems, a vehicular outer panel of the present invention includes: a transparent plate that is attached to a vehicle and constitutes an outer wall of a vehicle body; and a reflective display unit that is provided on an inner surface, in the inside/outside direction of the vehicle, of the transparent plate and is capable of displaying an image or a video for people outside the vehicle.

Advantageous Effects of the Invention

The present invention achieves displaying an image or a video, which is visible even outdoors under direct sunlight, for people outside the vehicle.

BRIEF DESCRIPTION OF DRAWINGS

FIG. 2 is a rear perspective view of a vehicle applied with the vehicular display system according to any of the first to fourth embodiments of the present invention;

FIG. 3 is a rear perspective view of a vehicle applied with the vehicular display system according to any of the first to fourth embodiments of the present invention;

FIG. 8 is a cross-sectional view schematically showing a second rear bumper provided with a floodlight;

FIG. 16 is a cross-sectional view taken along a line XVI-XVI in FIG. 10 to schematically show a vehicle applied with a vehicular display system according to the sixth embodiment of the present invention;

FIG. 19 is a cross-sectional view to schematically show a mounting structure of a first imaging unit;

FIG. 20 is a cross-sectional view to schematically show a mounting structure of a second imaging unit;

FIG. 21 is a diagram schematically showing a display unit;

FIG. 22A shows sunlight being used for display, while FIG. 22B shows a light source being used for display;

FIG. 23 is a perspective view to schematically show a vehicular display window according to the ninth embodiment of the present invention;

FIG. 24 is a cross-sectional view taken along a line XXIV-XXIV in FIG. 23;

FIG. 25A shows the vehicular display curtain in a closed state, while FIG. 25B shows the vehicular display curtain in an opened state;

EMBODIMENTS OF THE INVENTION

Figure 1:
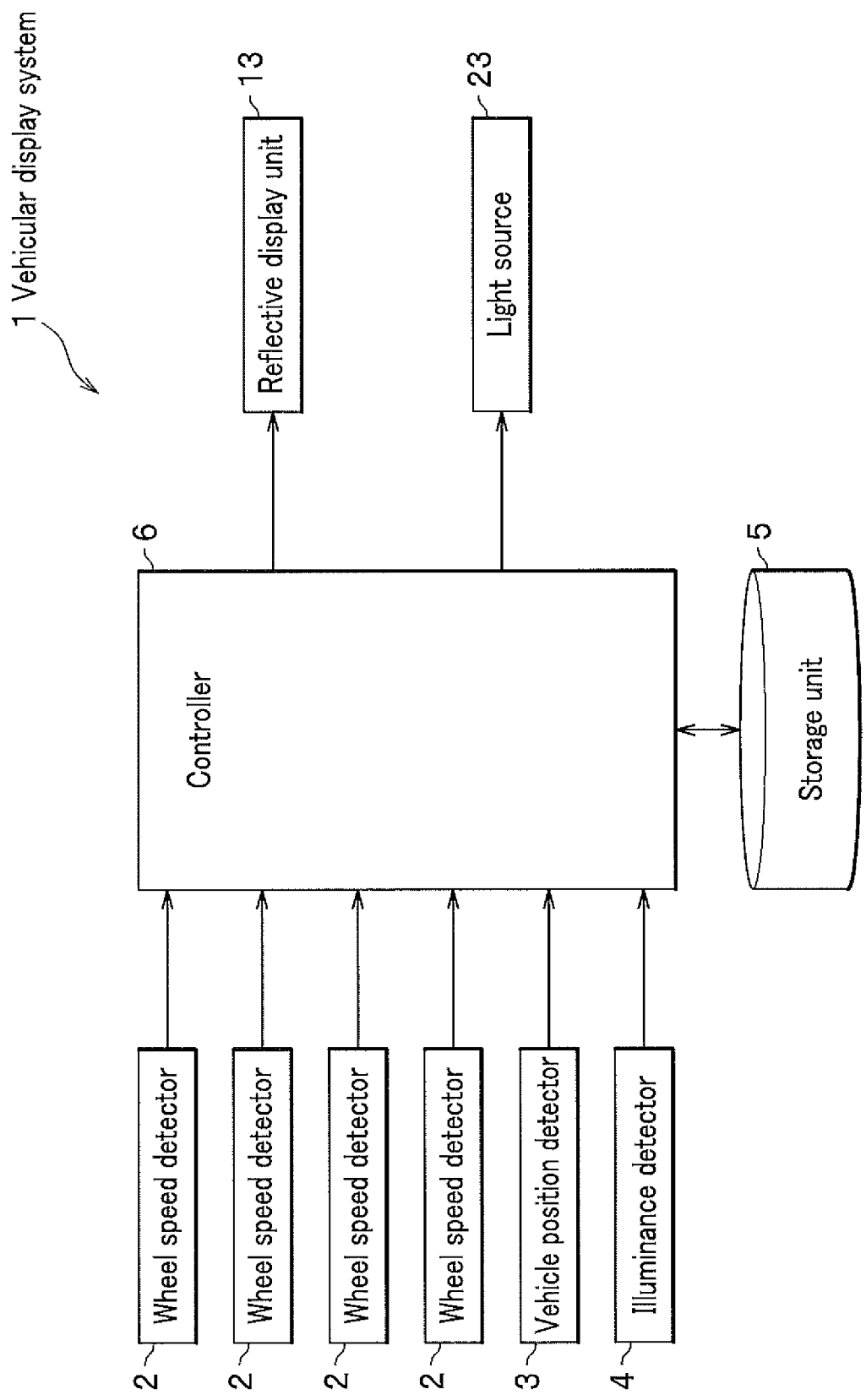
FIG. 1 is a block diagram schematically showing a vehicular display system according to any of first to seventh embodiments of the present invention.

Embodiments of the present invention will be described in detail with reference to the drawings. In the description, the same elements are denoted by the same reference numerals, and duplicate descriptions thereof are omitted. Note that directions indicated by arrowed lines in the drawings are such that the "front-rear" indicates the longitudinal direction of the vehicle body, the "up-down" indicates the vertical direction of the vehicle body, and the "right-left" indicates the lateral direction (vehicle width direction) as viewed from the driver seat.

<Vehicular Display System>

As shown in FIG. 1, a vehicular display system 1 according to an embodiment of the present invention is a system for displaying an image or a video for people outside a vehicle C. The vehicular display system 1 includes a wheel speed detector 2, a vehicle position detector 3, an illuminance detector 4, a storage unit 5, a controller 6, a reflective display unit 13, and a light source 23.

<Wheel Speed Detector>

The wheel speed detector 2 is a sensor that is provided for each wheel (e.g., a front right wheel, a front left wheel, a rear right wheel, and a rear left wheel) of the vehicle C, to detect the rotation speed (wheel speed) of the corresponding wheel and output the detection result to the controller 6. A rotary encoder can be used, for example, as the wheel speed detector 2.

<Vehicle Position Detector>

The vehicle position detector 3 is a sensor that detects the position of the vehicle C and outputs the detection result to the controller 6. A GPS (Global Positioning System) sensor can be used, for example, as the vehicle position detector 3.

<Illuminance Detector>

The illuminance detector 4 is a sensor that detects an illuminance around the vehicle C and outputs the detection result to the controller 6.

<Storage Unit>

The storage unit 5 is composed of a hard disk or the like, and stores map information, display data, and the like. Map information in a car navigation system can be used, for example, as map information.

<Controller>

The controller 6 includes a CPU (Central Processing Unit), a ROM (Read-Only Memory), a RAM (Random Access Memory), an input/output circuit, and the like. The controller 6 obtains the detection result of the wheel speed detector 2 to calculate the speed of the vehicle C (vehicle body speed) based on the obtained detection result and the wheel diameter stored in advance. In addition, the controller 6 controls the reflective display unit 13 and the light source 23 based on at least one of the speed of the vehicle C, the detection result of the vehicle position detector 3, and the detection result of the illuminance detector 4.

<Reflective Display Unit and Light Source>

The reflective display unit 13 is provided on a vehicular outer panel 10 (see FIG. 2) and is configured to display an image or a video for people outside the vehicle C. The light source 23 is configured to irradiate the display surface of the reflective display unit 13 with light.

<<Controlling Reflective Display Unit and Light Source>>

When the calculated speed of the vehicle C is equal to or less than a predetermined value (such as while running at a low speed or while parking), for instance, the controller 6 outputs the display data stored in the storage unit 5 to the reflective display unit 13 to cause the reflective display unit 13 to display an image or a video. Note that the controller 6 may obtain the display data in an external device via the Internet or the like, in place of the display data stored in the storage unit 5, to use the obtained display data. Here, the display data in the external device is not limited to advertisements, visual contents, or the like, and can be information on how to react to disasters and emergencies. Additionally, in a case where the vehicle C includes a speaker capable of generating sound to the outside, the controller 6 may control the speaker to generate sound based on the sound data and display data stored in the storage unit 5 as well as the sound data obtained from the external device.

In addition, the controller 6 determines an object (such as a shop) near the position of the vehicle C, based on the detection result of the vehicle position detector 3 and the map information stored in the storage unit 5, to output the display data corresponding to the object to the reflective display unit 13 for displaying an image or a video thereon. Note that the controller 6 may obtain map information in the external device via the Internet or the like, in place of the map information stored in the storage unit 5, to use the obtained map information.

Further, if the detection result of the illuminance detector 4 is equal to or less than a predetermined value (such as during cloudy weather and during the night) while an image or a video is being displayed on the reflective display unit 13, the controller 6 controls the light source 23 to be turned on to irradiate the reflective display unit 13 with the light.

Still further, the controller 6 may select an image or a video to be displayed on the reflective display unit 13 or control the light source 23, based on the result of a driver or the like operating an operation unit (such as a switch, a button, and a touch panel).

The vehicular display system 1 according to the embodiment of the present invention includes: an illuminance detector 4 that detects an illuminance around the vehicle C; and a controller 6 that controls the reflective display unit 13 to display an image or a video on the reflective display unit 13, and controls the light source 23 based on a detection result of the illuminance detector 4. Therefore, the vehicular display system 1 is capable of automatically controlling the light source 23 based on the illuminance around the vehicle C.

Still further, the vehicular display system 1 according to the embodiment of the present invention includes a vehicle position detector 3 that detects a position of the vehicle C, and the controller 6 controls the reflective display unit 13 based on the detection result of the vehicle position detector 3. Therefore, the vehicular display system 1 is capable of displaying an image or a video suitable for the position of the vehicle C on the reflective display unit 13.

Still further, the vehicular display system 1 according to the embodiment of the present invention controls the reflective display unit 13 based on the speed of the vehicle C. Therefore, the vehicular display system 1 is capable of displaying an image or a video depending on the speed of the vehicle C. For example, the vehicular display system 1 is capable of displaying an image or a video on the reflective display unit 13 when the vehicle C is parked to allow people therearound to easily view an image or a video.

First to Fourth Embodiments

Next, descriptions will be given of vehicular display systems according to first to fourth embodiments of the present invention, with reference to cases where an image or a video is displayed on the rear wall of the vehicle body (body). In each embodiment, the controller 6 (see FIG. 1) is capable of displaying a general design of the tailgate 10 (such as a rear window and an emblem) on the reflective display unit 13, as shown in FIG. 2, or displaying a desired image or video on the reflective display unit 13, as shown in FIG. 3. That is, the vehicular display system is capable of using images to be displayed on a screen printing layer 12 and the reflective display unit 13, which are to be described later, to provide a general design of the rear surface of the vehicle C. In this manner, the vehicular display system is capable of displaying a general design of the vehicle C, if it is not desirable to display an image or a video of an advertisement or the like based on the TPO (time, place, objective).

First Embodiment

Figure 4:
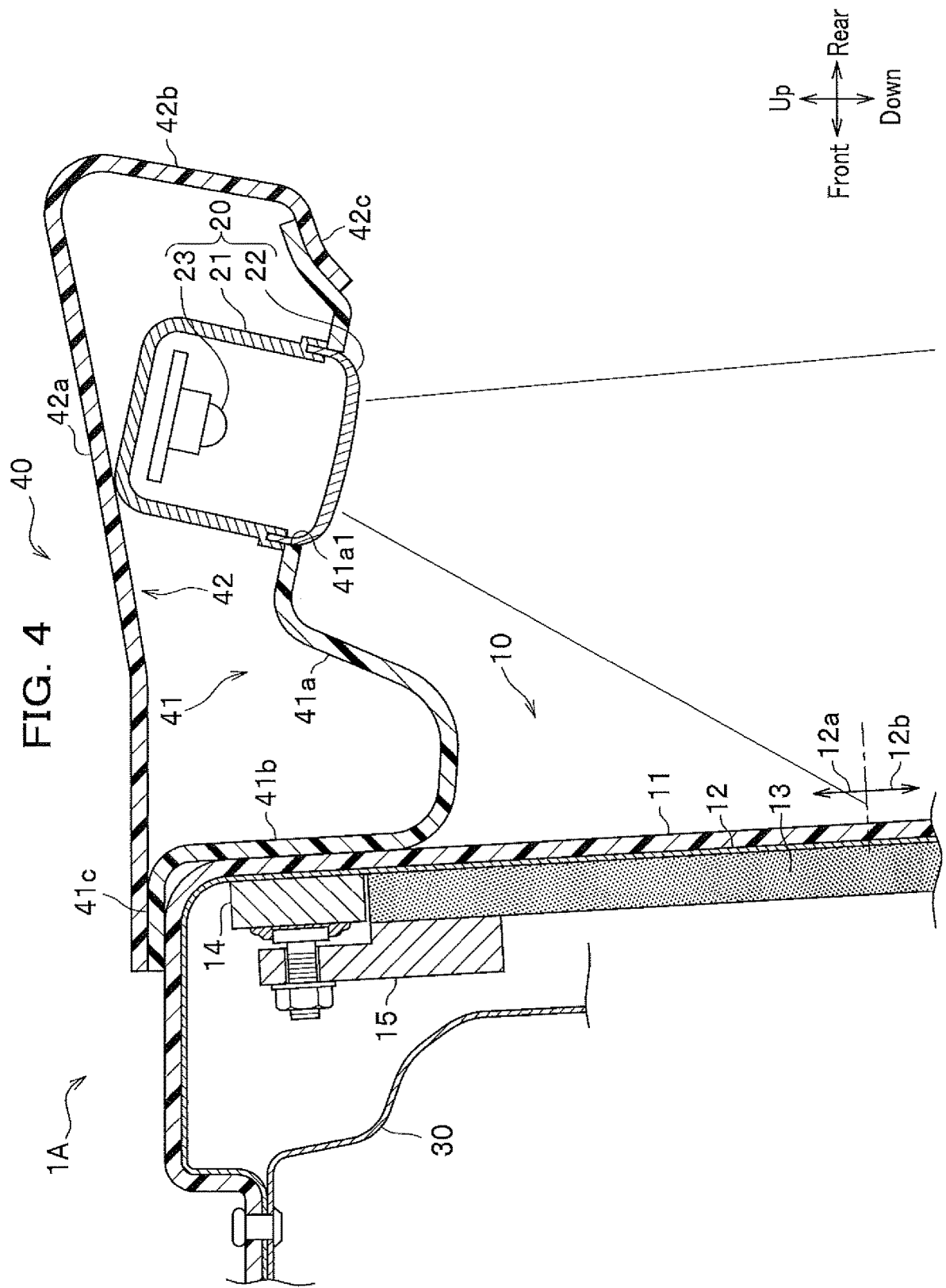
FIG. 4 is cross-sectional view taken along a line IV-IV in FIG. 2 to schematically show a vehicle applied with a vehicular display system according to the first embodiment of the present invention.

As shown in FIG. 4 which is a cross-sectional view taken along a line IV-IV in FIG. 2, a vehicular display system 1A according to the first embodiment of the present invention is a system to display an image or a video on a rear wall of a vehicle body, more specifically, the tailgate 10 provided in a rear opening of the vehicle body. The vehicle C includes, as a rear structure of the vehicle body, the tailgate 10 which is a vehicular outer panel, a floodlight 20, a tailgate frame 30, and a rear spoiler 40.

<Tailgate>

The tailgate 10 is a vehicular outer panel that is attached to a rear opening formed in the tailgate frame 30 so as to be opened and closed. The tailgate 10 includes a transparent plate 11, the screen printing layer 12, the reflective display unit 13, and a seat member 14.

<<Transparent Plate>>

The transparent plate 11 is a plate member that constitutes the outer wall (rear wall) of the vehicle body. The transparent plate 11 is formed of glass, resin (e.g., polycarbonate etc.), or the like. The upper end of the transparent plate 11 is bent forward and connected to the tail gate frame 30.

<<Screen Printing Layer>>

The screen printing layer 12 is a layer formed by screen printing on an inner surface, in the inside/outside direction of a vehicle, (front surface) of the transparent plate 11. The screen printing layer 12 includes an opaque layer (colored layer) 12a in a belt shape formed on the upper and lower ends of the transparent plate 11 and a transparent layer 12b in a rectangular shape formed between the upper and lower opaque layers 12a.

<<Reflective Display Unit>>

The reflective display unit 13 is provided on the inner surface, in the inside/outside direction of a vehicle, (front surface) of the transparent plate 11, and is a member capable of displaying an image or a video for people outside (rear of) the vehicle. A reflective liquid crystal panel, a reflective electronic paper, or the like is preferably used as the reflective display unit 13. The reflective liquid crystal panel, for example, includes a liquid crystal part on a side closer to the transparent plate 11, and a reflective plate provided on the inner side, in the inside/outside direction of a vehicle, (front side) of the liquid crystal part. That is, the reflective display unit 13 has no light source incorporated, and reflects light from outside the reflective display unit 13 so that an image or a video displayed on the reflective display unit 13 is suitably viewed. In the present embodiment, a pressing member 15 is mechanically fastened (e.g., bolted) to the seat member 14, which is attached by bonding or the like to an vehicle inner surface, in the inside/outside direction of a vehicle, (front face) of the opaque layer 12a of the screen printing layer 12, to attach the reflective display unit 13 so as to be in close contact with the transparent layer 12b.

<<Seat Member>>

The seat member 14 is a member made of metal or resin arranged by bonding or the like on the inner surface, in the inside/outside direction of the vehicle, of the opaque layer 12a of the screen printing layer 12. In the present embodiment, the pressing member 15 for pressing an edge portion of the reflective display unit 13 is mechanically fastened (bolted) to the seat member 14.

<Method of Manufacturing Vehicular Outer Panel (Tailgate)>

The tailgate 10 can be manufactured by executing: a step of providing the screen printing layer 12, the reflective display unit 13, and the seat member 14 on the transparent plate 11 in a flat plate shape (made of resin in this case); a step of molding the transparent plate 11, which is provided with the screen printing layer 12, the reflective display unit 13, and the seat member 14, by pressure molding; and a step of processing the seat member 14. Here, in the step of processing the seat member 14, the seat member 14 is cut into a desired shape, formed to have bolt holes and the like, and so on.

<Floodlight>

The floodlight 20 is used for irradiating a display surface (outer surface in the inside/outside direction of a vehicle) of the reflective display unit 13 with light from outside the vehicle during the night or the like. The floodlight 20 includes a housing 21, a transparent cover 22 to cover an opening of the housing 21, and the light source (e.g., LED, Light Emitting Diode, or the like) 23 housed in the housing 21.

<Tailgate Frame>

The tail gate frame 30 is a metal framework member that constitutes an inner part of the tailgate 10 as described above. That is, the tailgate 10 is an outer tailgate and the tailgate frame 30 is an inner tailgate. The tailgate 10 and the tailgate frame 30 are provided so as to be capable of covering and uncovering a rear opening formed in a body panel 130 (see FIG. 5).

<Rear Spoiler>

The rear spoiler 40 is an aerodynamic member or a design member made of metal or resin to be provided on the rear side of an upper edge of the tailgate 10. In the present embodiment, the rear spoiler 40 is made by combining a lower rear spoiler 41 with an upper rear spoiler 42.

The lower rear spoiler 41 integrally includes a lower wall portion 41a, a front wall portion 41b extending upward from the front end of the lower wall portion 41a, a flange portion 41c extending forward from the upper end of the front wall portion 41b. The upper rear spoiler 42 integrally includes an upper wall portion 42a, a rear wall portion 42b extending downward from the rear end of the upper wall portion 42a, and a flange portion 42c extending forward from the lower end of the rear wall portion 42b. The flange portion 41c is attached to the lower surface of the front end of the upper wall portion 42a. The flange portion 42c is attached to the lower surface of the rear end of the lower wall portion 41a. The front wall portion 41b is attached to the rear surface of the upper end of the tailgate 10. A front end of the upper wall portion 42a and the flange portion 41c are attached to an upper surface of a portion, which is bent forward, of the upper end of the tailgate 10.

<<Arrangement of Floodlight>>

In the present embodiment, the floodlight 20 is provided in the rear spoiler 40. The transparent cover 22 of the floodlight 20 is provided in the lower rear spoiler 41 so as to cover an opening 41a1 formed in the lower wall portion 41a. The light source 23 of the floodlight 20 is capable of irradiating the reflective display unit 13 with light from outside the vehicle and from obliquely above, through the transparent cover 22, the transparent plate 11, and the transparent layer 12b.

The vehicular outer panel 10 according to the first embodiment of the present invention includes a transparent plate 11 that is attached to the vehicle C and constitutes an outer wall of the body, and the reflective display unit 13 that is provided on the inner surface, in the inside/outside direction of the vehicle, of the transparent plate 11 and is capable of displaying an image or a video for people outside the vehicle. Accordingly, the vehicular outer panel 10 is capable of displaying an image or a video (such as an advertisement) which is suitably visible even outdoors under direct sunlight (particularly, in the scorching sun) for people outside the vehicle C. Additionally, the vehicular outer panel 10 is capable of displaying a various image or video (such as an advertisement) in an energy-saving manner, while protecting the reflective display unit 13 with the transparent plate 11.

In addition, the vehicular display system 1A according to the first embodiment of the present invention includes the vehicular outer panel 10 (or a vehicular display curtain, or a vehicular display convertible top), and light source 23 which is capable of projecting light on the display surface of the reflective display unit 13. Then, the vehicular display system 1A uses the light source 23 during the night or the like to irradiate the reflective display unit 13 with light for suitably displaying an image or a video.

Further, the vehicular display system 1A according to the first embodiment of the present invention has the vehicular outer panel 10 (or the vehicular display curtain, or the vehicular display convertible top) to constitute the rear surface of the vehicle, and has the light source 23 provided on the rear spoiler 40 which is arranged above the vehicular outer panel 10 (or the vehicular display curtain, or the vehicular display convertible top). Then, the vehicular display system 1A uses the light source 23 during the night or the like to irradiate the reflective display unit 13 with light from above for suitably displaying an image or a video.

Second Embodiment

Figure 5:
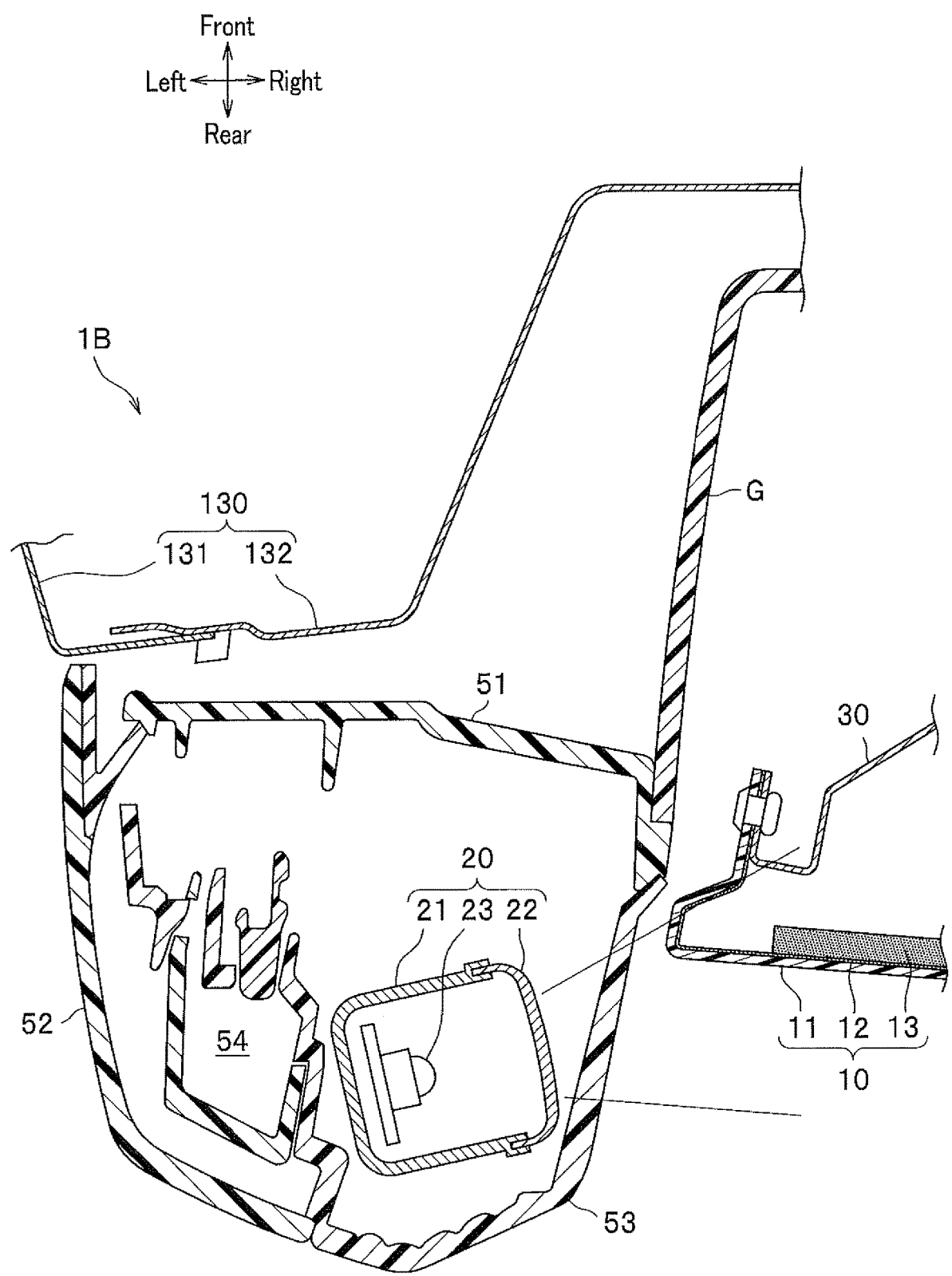
FIG. 5 is a cross-sectional view taken along a line V-V in FIG. 2 to schematically show a vehicle applied with a vehicular display system according to the second embodiment of the present invention.

A description will be given of a vehicular display system according to a second embodiment of the present invention, focusing on differences from the vehicular display system 1A according to the first embodiment. As shown in FIG. 5 which is a cross-sectional view taken along a line V-V in FIG. 2, a vehicular display system 1B according to the second embodiment of the present invention has the floodlight 20 provided in a rear lamp 50 that is arranged on the rear side of a garnish G, which constitutes a design surface inside the vehicle, and the body panel 130.

<Body Panel>

The body panel 130 is a metal framework member constituting a side wall in the vehicle width direction of the vehicle C. The body panel 130 is formed by combining an outer body panel 131 with an inner body panel 132.

<Rear Lamp>

The rear lamp 50 includes a base part 51, a first transparent cover 52, a second transparent cover 53, and a stop lamp light source 54. The base part 51 is a plate-like member made of resin provided in a vertical frame of the garnish G, which extends in the vertical direction at an end in the vehicle width direction, so as to extend from the rear of the vertical frame to the rear end of the inner body panel 132. The first transparent cover 52 is a colored transparent (red transparent) cover member provided on the rear side of the outside in the vehicle width direction of the base part 51. The second transparent cover 53 is a colorless and transparent cover member provided on the rear side of the inside in the vehicle width direction of the base portion 51. The first transparent cover 52 and the second transparent cover 53 are provided so as to protrude rearward from the tailgate 10 and are connected to each other to form an integral transparent cover. The stop lamp light source 54 is a light source for emitting light rearward through the first transparent cover 52 at the time of brake operation.

Note that a third transparent cover, which is a colorless and transparent lid member, is provided on the lower side of the first transparent cover 52. Additionally, a light source for a rear lamp is provided in front of the third transparent cover and behind the base part 51. The light source for the rear lamp is a light source for emitting light rearward through the third transparent cover, based on the detection result of the illuminance detector 4 (see FIG. 1) and the like.

<<Arrangement of Floodlight>>

In the present embodiment, the floodlight 20 is provided in the rear lamp 50 on an inner side in the vehicle width direction of the stop lamp light source 54. The light source 23 of the floodlight 20 is capable of irradiating the reflective display unit 13 with light from outside the vehicle and from obliquely sideways, through the transparent cover 22, the second transparent cover 53, the transparent plate 11, and the transparent layer 12b.

The vehicular display system 1B according to the second embodiment of the present invention has the vehicular outer panel 10 (or the vehicular display curtain, or the vehicular display convertible top) to constitute the rear surface of the vehicle, and has the light source 23 provided in the rear lamp 50 which is arranged on an outer side in the vehicle width direction of the vehicular outer panel 10 (or the vehicular display curtain, or the vehicular display convertible top). Then, the vehicular display system 1B uses the light source 23 to irradiate the reflective display unit 13 with light from sideways during the night or the like for suitably displaying an image or a video.

Third Embodiment

Figure 6:
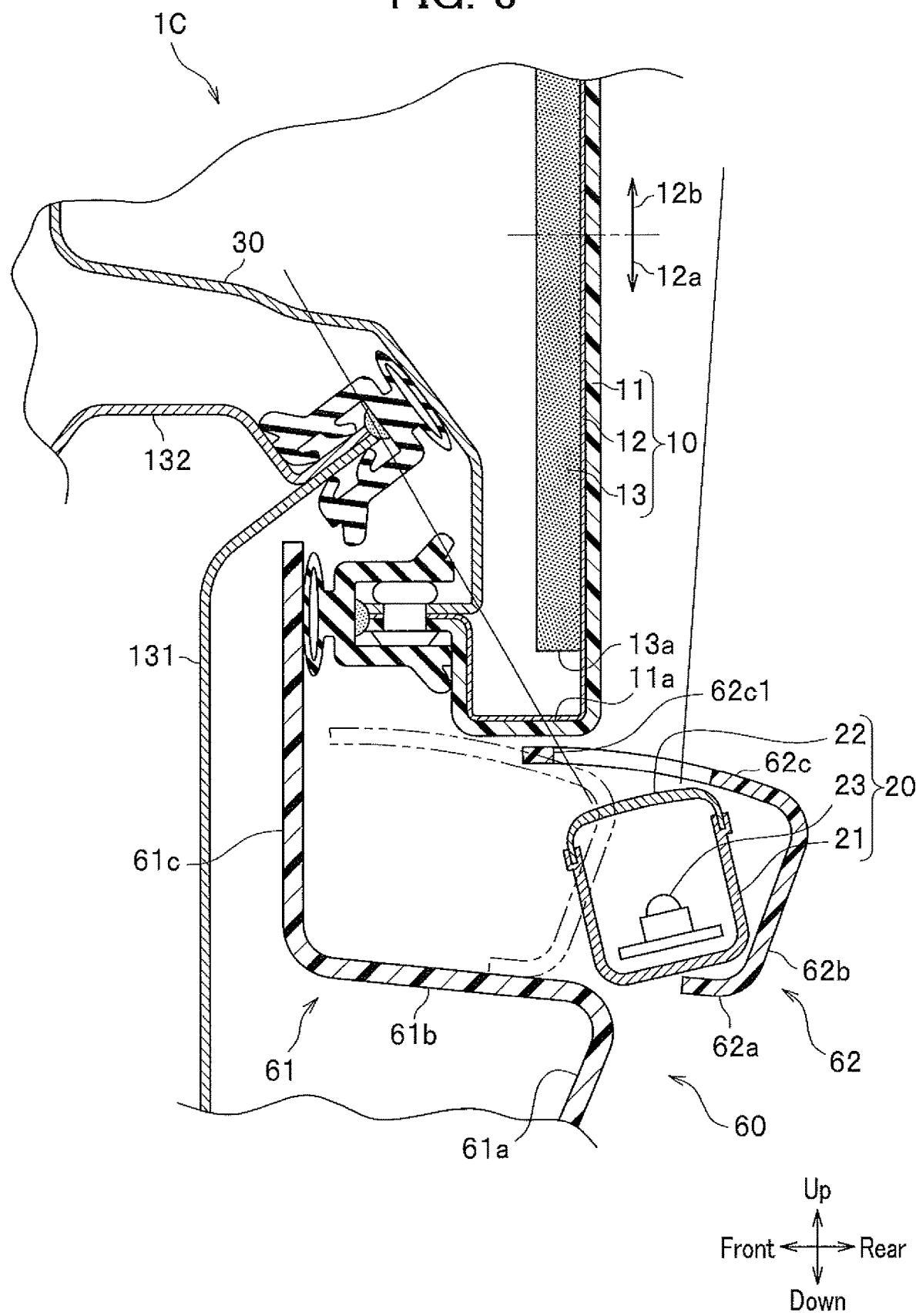
FIG. 6 is a cross-sectional view taken along a line VI-VI in FIG. 2 to schematically show a vehicle applied with a vehicular display system according to the third embodiment of the present invention.

A description will be given of a vehicular display system according to a third embodiment of the present invention, focusing on differences from the vehicular display system 1A according to the first embodiment. As shown in FIG. 6 which is a cross-sectional view taken along a line VI-VI in FIG. 2, the vehicular display system 1C according to the third embodiment of the present invention has the floodlight 20 provided in a rear bumper 60.

<Rear Bumper>

The rear bumper 60 is a impact absorbing member made of metal or resin that extends in the vehicle width direction below the tailgate 10 of the vehicle C. In the present embodiment, the rear bumper 60 includes a first rear bumper 61 and a second rear bumper 62 provided above the first rear bumper 61.

The first rear bumper 61 is a main part of the rear bumper 60 and integrally includes a rear wall 61a, an upper wall 61b extending forward from upper end of the rear wall 61a, and a front wall 61c extending upward from a front end of the upper wall 61b. The second rear bumper 62 is provided on the upper wall 61b of the first rear bumper 61 so as to be movable in the front-rear direction, and integrally includes a lower wall 62a, a rear wall 62b extending upward from the rear end of the lower wall 62a, and an upper wall 62c extending forward from the upper end of the rear wall 62b. A translucent part 62c1 (an opening, a window made of a transparent resin or the like) is formed in the upper wall 62c.

<<Transparent Plate and Reflective Display Unit>>

The lower end of the transparent plate 11 is bent forward. Additionally, a lower edge 13a of the reflective display unit 13 is positioned above a lower edge 11a of the transparent plate 11, for example, by 5 mm or more.

<<Arrangement of Floodlight>>

Figure 7:
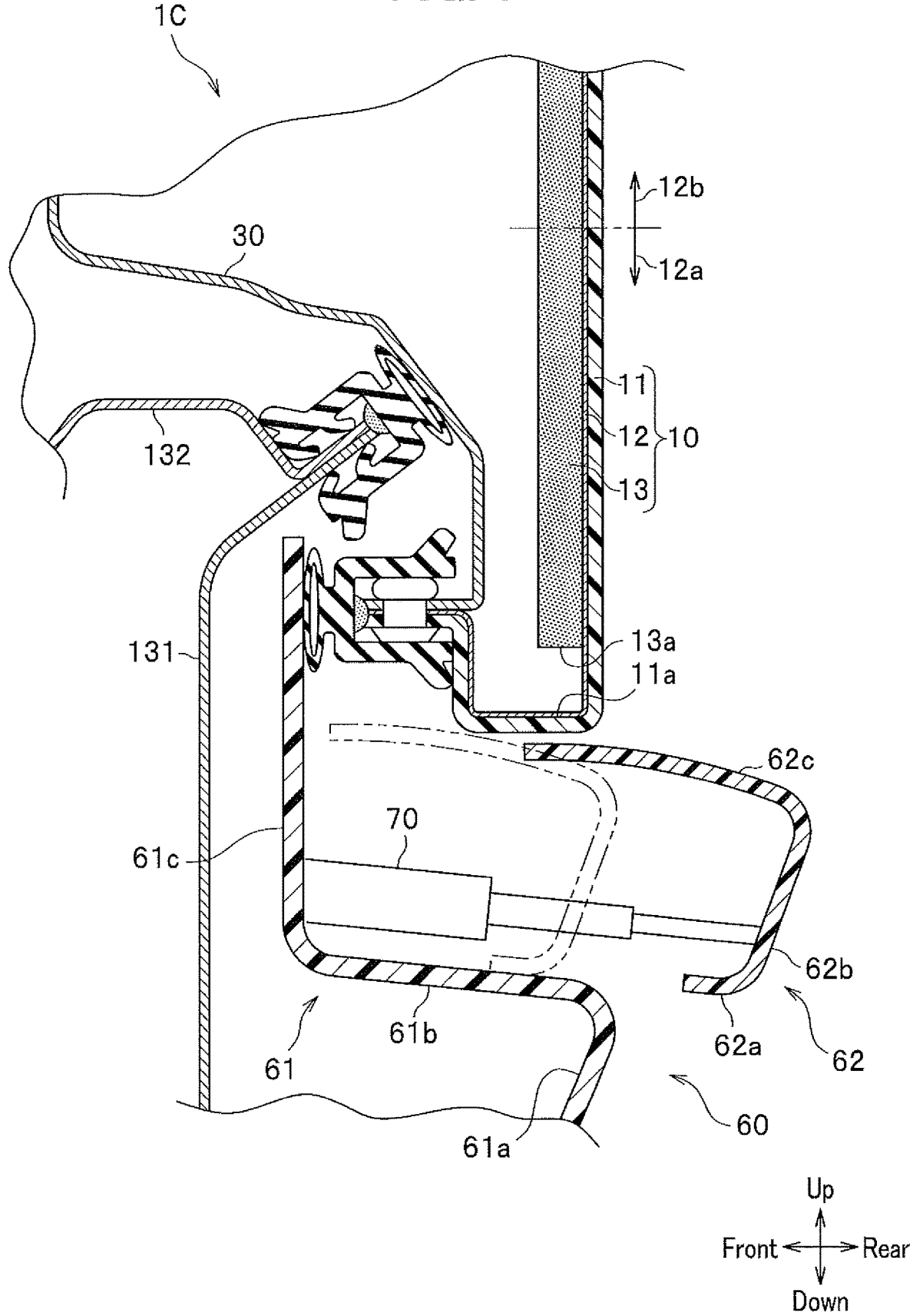
FIG. 7 is a cross-sectional view taken along a line VII-VII in FIG. 2 to schematically show a vehicle applied with a vehicular display system according to the third embodiment of the present invention.

In the present embodiment, the floodlight 20 is provided in the second rear bumper 62. As shown in FIG. 7 which is a cross-sectional view taken along a line VII-VII in FIG. 2, the vehicular display system 1C includes a moving mechanism 70. The moving mechanism 70 is, for example, a piston mechanism installed between the front wall 61c of the first rear bumper 61 and the rear wall 62b of the second rear bumper 62, and controlled by the controller 6 (see FIG. 1) so as to move the second rear bumper 62 in the front-rear direction. As shown in FIG. 6, in a state that the second rear bumper 62 is moved rearward, the light source 23 of the floodlight 20 is capable of irradiating the reflective display unit 13 with light from outside the vehicle and from obliquely below, through the transparent cover 22 of the upper wall 62c, the translucent part 62c1 of the upper wall 62c, the transparent plate 11, and the transparent layer 12b.

In addition, in the present embodiment, the floodlight 20 is attached to the rear wall 62b via the seat member 14, as shown in FIG. 8. The floodlight 20 includes the two or more light sources 23 arranged in the vehicle width direction. Such a configuration of the floodlight 20 is also the same in other embodiments. Additionally, the moving mechanism 70 (see FIG. 7) is provided on both ends in the longitudinal direction of the floodlight 20. Such an arrangement of the moving mechanism 70 is also the same in other embodiments including the moving mechanism 70.

In the vehicle outer panel 10 according to the third embodiment of the present invention, the lower edge 13a of the reflective display unit 13 is positioned above the lower edge 11a of the transparent plate 11. Then, the vehicular outer panel 10 is capable of preventing the lower edge of the reflective display unit 13 from submerging, when moisture in the air such as inside the vehicle or inside the door condenses to stay at the lowermost end of the vehicular outer panel 10.

Further, the vehicular display system 1C according to the third embodiment of the present invention has the vehicular outer panel 10 (or the vehicular display curtain, or the vehicular display convertible top) to constitute the rear surface of the vehicle, and has the light source 23 provided on the rear bumper 60 which is arranged below the vehicular outer panel 10 (or the vehicular display curtain, or the vehicular display convertible top). Then, the vehicular display system 1C is capable of using the light source 23 during the night or the like to irradiate the reflective display unit 13 with light from below for suitably displaying an image or a video.

Fourth Embodiment

Figure 9:
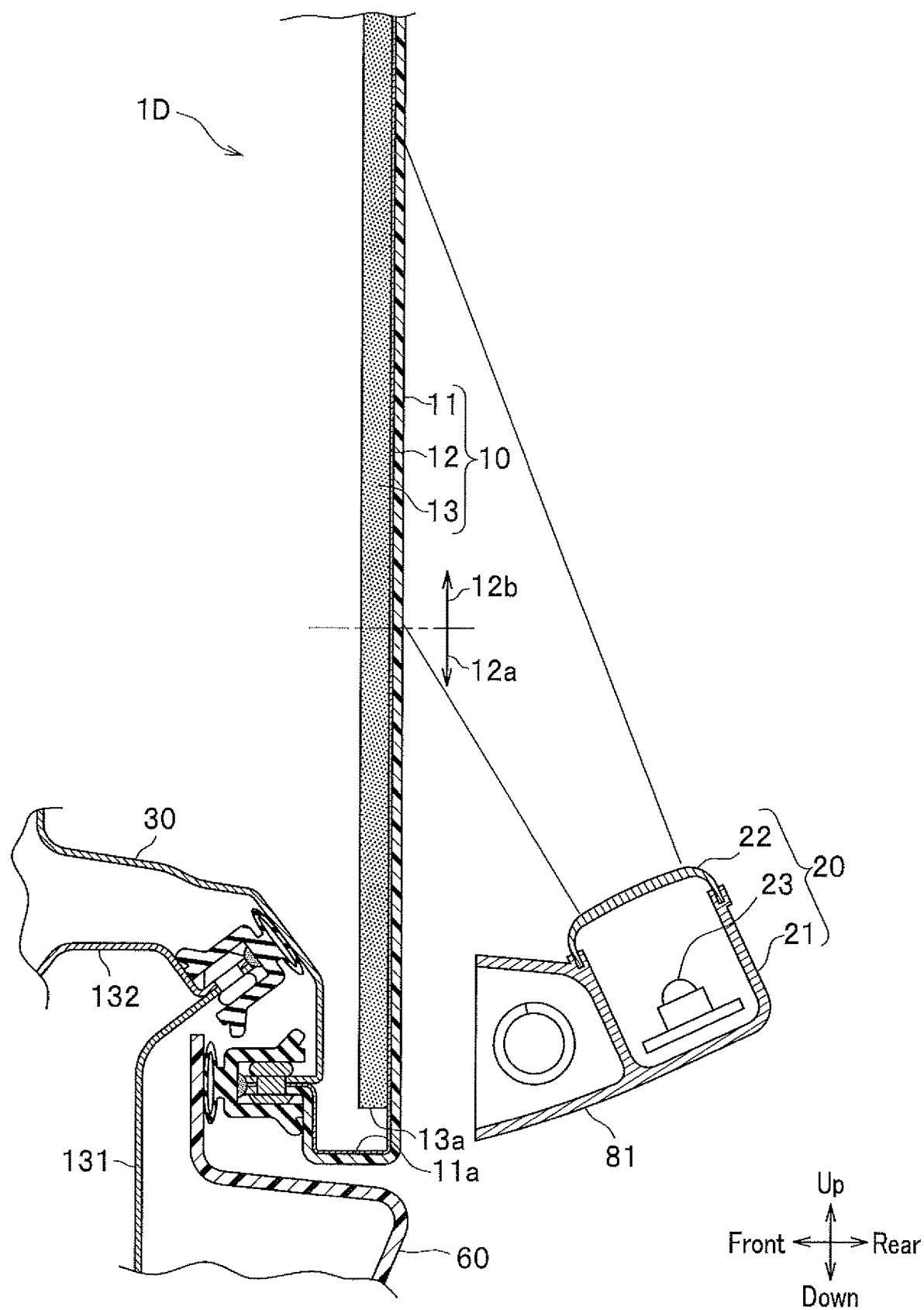
FIG. 9 is a cross-sectional view taken along a line IX-IX in FIG. 2 to schematically show a vehicle applied with a vehicular display system according to the fourth embodiment of the present invention.

A description will be given of a vehicular display system according to a fourth embodiment of the present invention, focusing on differences from the vehicular display system 1A according to the first embodiment. As shown in FIG. 9 which is a cross-sectional view taken along a line IX-IX in FIG. 2, a vehicular display system 1D according to the fourth embodiment of the present invention has the floodlight 20 provided in a wiper 80.

<Wiper>

As shown in FIG. 2, the vehicle C includes four wipers 80 in a vehicle body rear structure. The wiper 80 is provided at one of the four corners of the outer surface, in the inside/outside direction of the vehicle, of the tailgate 10, and includes a wiper arm 81 that is swingable about a corner portion thereof, a wiper blade 82 that is attached to the wiper arm 81 for wiping the outer surface, in the inside/outside direction of the vehicle, of the tailgate. In addition, each of the two wipers 80 on the upper side is integrally provided with a nozzle for spraying washer fluid onto the outer surface, in the inside/outside direction of the vehicle, of the tailgate 10.

<<Transparent Plate and Reflective Display Unit>>

As shown in FIG. 9, the lower end of the transparent plate 11 is bent forward. In addition, the lower edge 13a of the reflective display unit 13 is positioned above the lower edge 11a of the transparent plate 11, for example, by 5 mm or more.

<<Arrangement of Floodlight>>

In the present embodiment, the floodlight 20 is provided integrally with each of the two wipers 80 on the lower side. Specifically, the housing 21 of the floodlight 20 is integrally formed with the wiper arm 81. The light source 23 of the floodlight 20 is capable of irradiating the reflective display unit 13 with light from outside the vehicle and from obliquely below, through the transparent cover 22, the transparent plate 11, and the transparent layer 12b.

The vehicular display system 1D according to the fourth embodiment of the present invention includes the vehicular outer panel 10, and has the light source 23 provided in the wiper 80 for wiping the outer surface, in the inside/outside direction of the vehicle, of the vehicular outer panel 10. Then, the vehicular display system 1D is capable of preventing deterioration of the visibility of an image or a video due to adhesion of water droplets or the like, and using the light source 23 during the night or the like to irradiate the reflective display unit 13 with light for suitably displaying an image or a video.

Fifth to Seventh Embodiments

Figure 10:
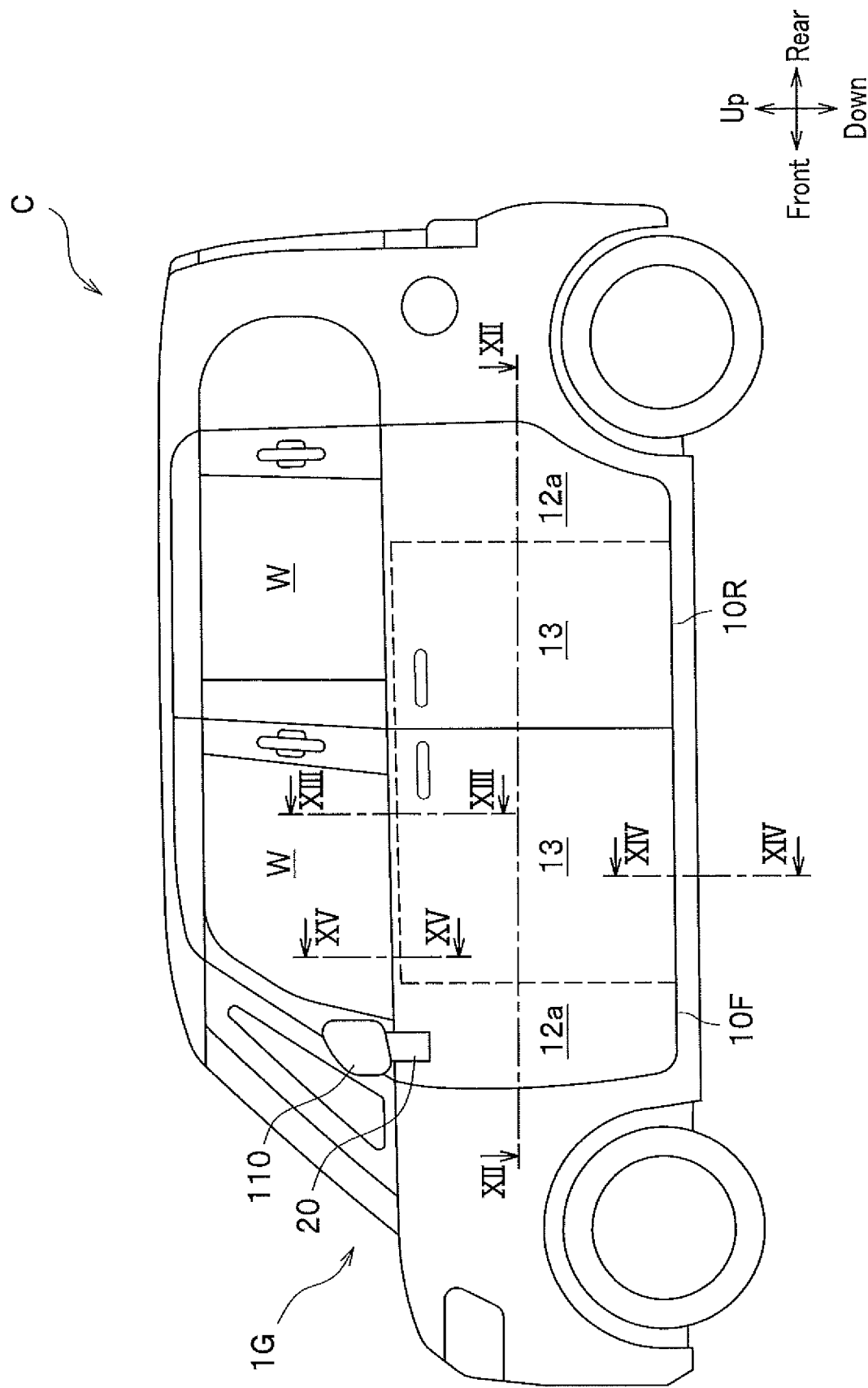
FIG. 10 is a side view of a vehicle applied with a vehicular display system according to any of fifth to seventh embodiments of the present invention.
Figure 11:
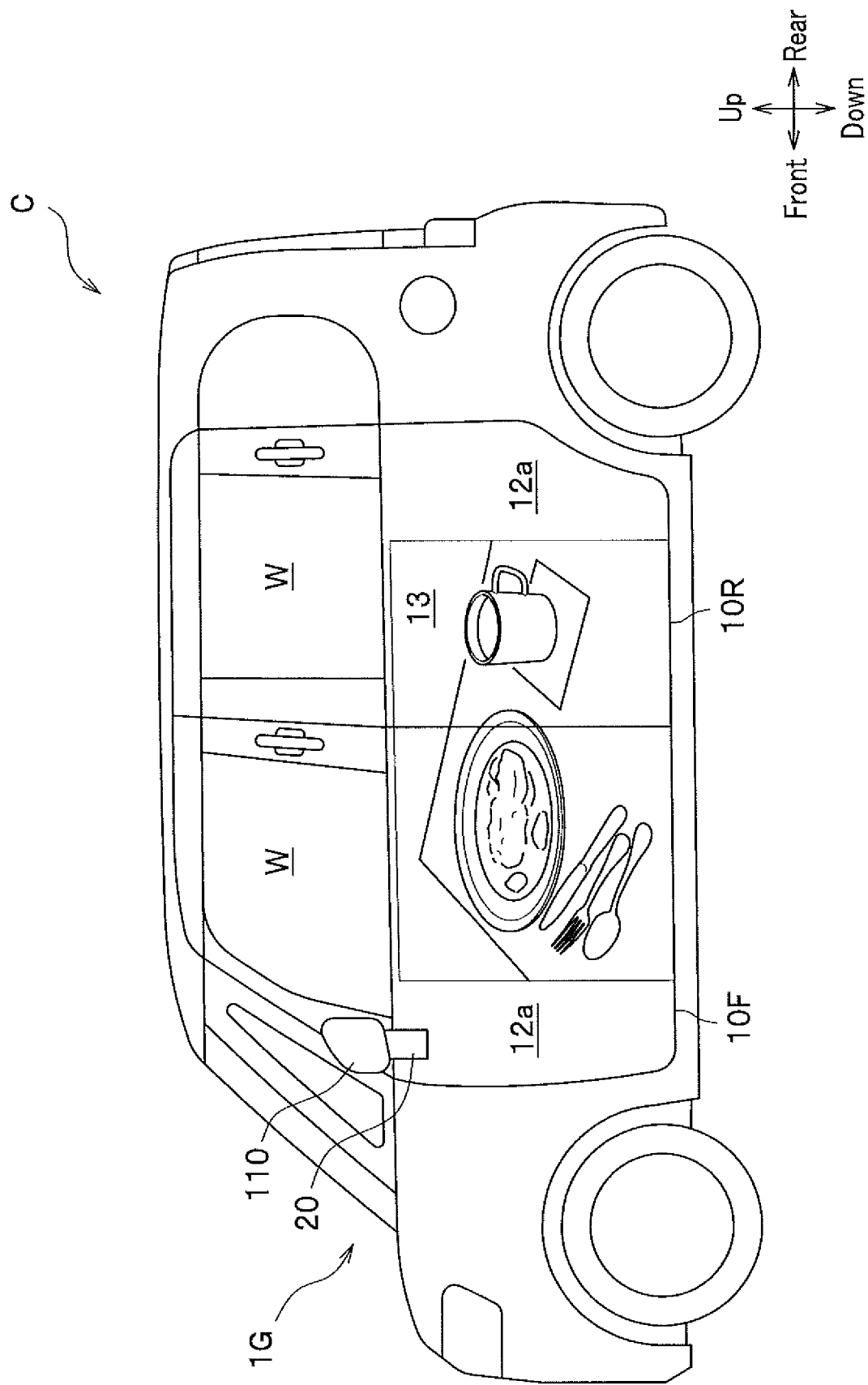
FIG. 11 is a side view of a vehicle applied with a vehicular display system according to any of fifth to seventh embodiments of the present invention.

Next, descriptions will be given of vehicular display systems according to fifth to seventh embodiments of the present invention, with reference to cases where an image or a video is displayed on one or more side walls of a vehicle body (body). In each embodiment, the controller 6 (see FIG. 1) is capable of displaying a general design of an outer front door 10F and an outer rear door 10R (such as a dummy door handle) on the reflective display unit 13, as shown in FIG. 10, or displaying a desired image or video on the reflective display unit 13, as shown in FIG. 11. That is, the vehicular display system is capable of using images to be displayed on the screen printing layer 12 and the reflective display unit 13, which are to be described later, to provide a general design of the side surface of the vehicle C. In this manner, the vehicular display system is capable of displaying a general design of the vehicle C, if it is not desirable to display an image or a video of an advertisement or the like based on the TPO (time, place, objective).

Fifth Embodiment

Figure 12:
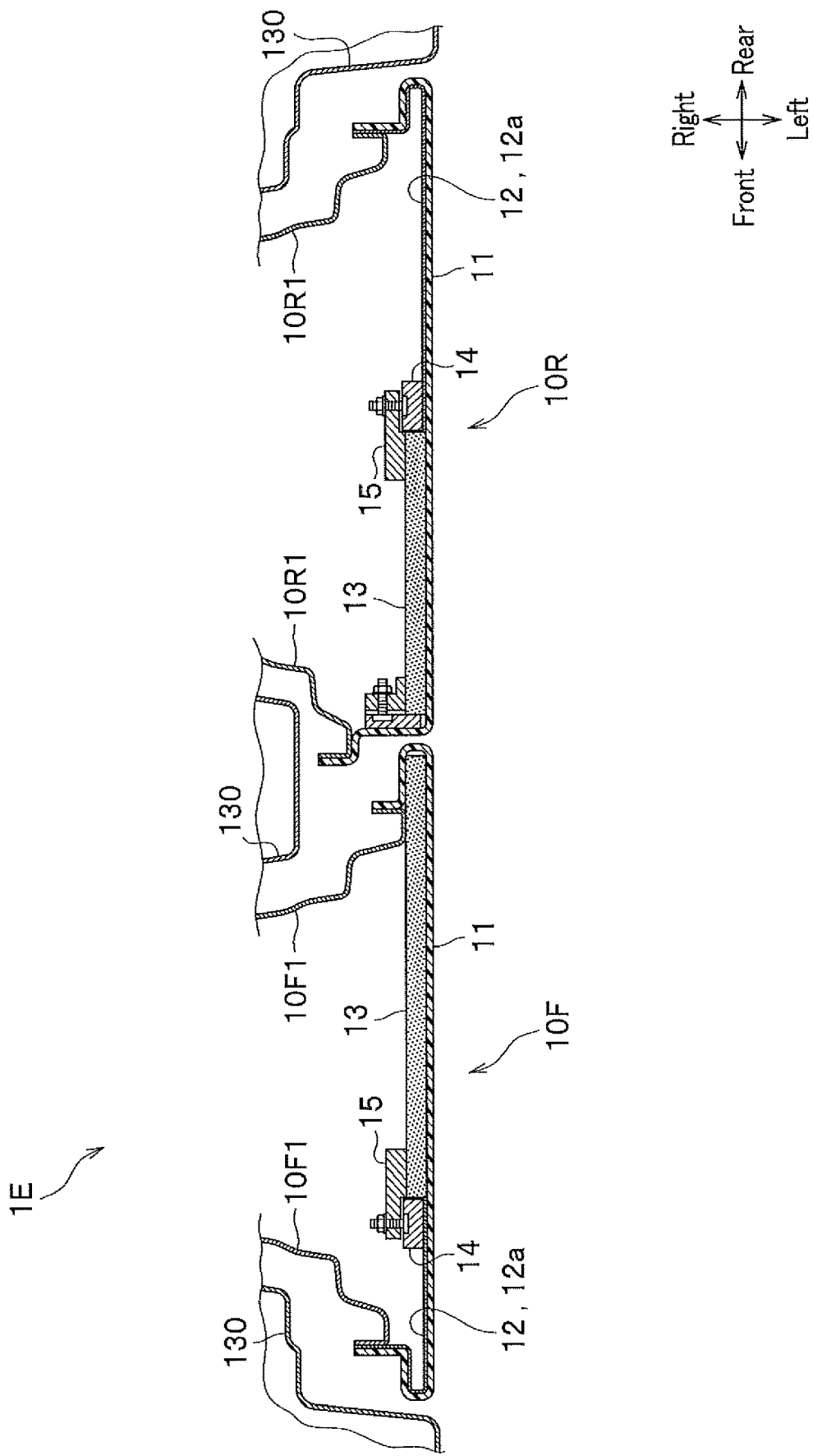
FIG. 12 is a cross-sectional view taken along a line XII-XII in FIG. 10 to schematically show a vehicle applied with a vehicular display system according to the fifth embodiment of the present invention.

As shown in FIG. 12 which is a cross-sectional view taken along a line XII-XII in FIG. 10, a vehicular display system 1E according to the fifth embodiment of the present invention is a system to display an image or a video on a side wall of a vehicle body, more specifically, a front door (outer panel) 10F and a rear door (outer panel) 10R provided in a side opening of the vehicle body. The vehicle C includes the outer front door 10F and the outer rear door 10R, which are vehicular outer panels, the floodlight 20 (see FIG. 13), and a body panel 130.

<Outer Front Door>

The outer front door 10F is a vehicular outer panel that constitutes a front door together with an inner front door 10F1. The outer front door 10F includes the transparent plate 11, the screen printing layer 12, and the reflective display unit 13, as with the tailgate 10 (see FIG. 2). The screen printing layer 12 includes only the opaque layer 12a, and the reflective display unit 13 is directly arranged on the inner surface, in the inside/outside direction of a vehicle, of the transparent plate 11 without having the transparent layer 12b therebetween. A front end and a rear end of the transparent plate 11 are respectively bent inward, in the inside/outside direction of a vehicle, and are connected to the inner front door 10F1, <Outer Rear Door>

The outer rear door 10R is a vehicular outer panel that constitutes a rear door together with an inner rear door 10R1. The outer rear door 10R includes the transparent plate 11, the screen printing layer 12, and the reflective display unit 13, as with the tailgate 10 (see FIG. 2). The screen printing layer 12 includes only the opaque layer 12a, and the reflective display unit 13 is directly arranged on the inner surface, in the inside/outside direction of a vehicle, of the transparent plate 11 without having the transparent layer 12b therebetween. The front and rear ends of the transparent plate 11 are respectively bent inward, in the inside/outside direction of a vehicle, and are connected to the inner rear door 10R1.

<Body Panel>

The body panel 130 is a metal frame member constituting a side wall in the vehicle width direction of the vehicle C. A side opening is formed in the body panel 130. A front door and a rear door are provided in the side opening so as to be opened and closed.

Figure 13:
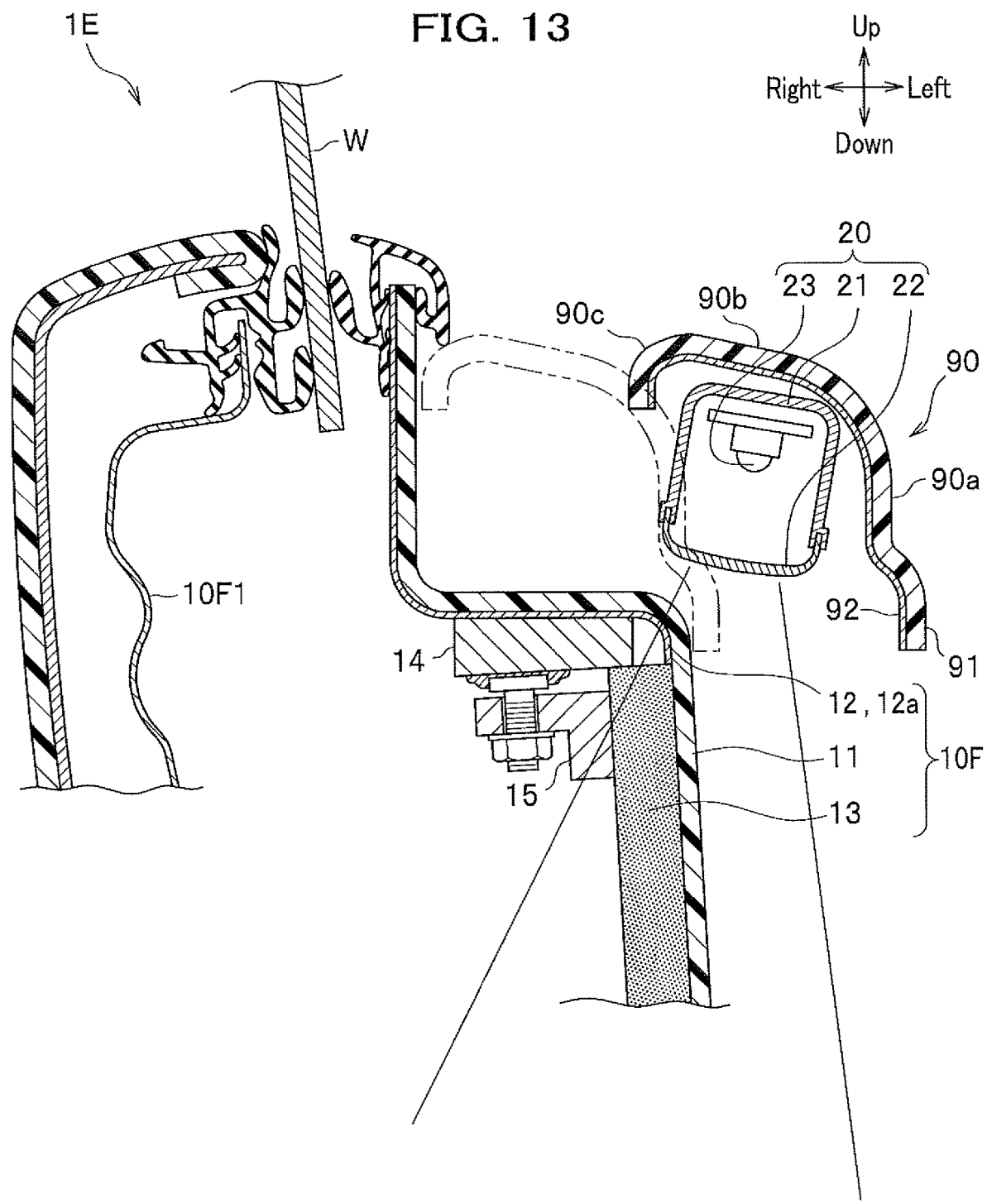
FIG. 13 is a cross-sectional view taken along a line XIII-XIII in FIG. 10 to schematically show a vehicle applied with the vehicular display system according to the fifth embodiment of the present invention.

In addition, as shown in FIG. 13 which is a cross-sectional view taken along a line XIII-XIII in FIG. 10, the outer front door 10F includes the seat member 14. The seat member 14 is a member made of metal or resin arranged by bonding or the like on the inner surface, in the inside/outside direction of the vehicle, of the screen printed layer 12. In the present embodiment, a pressing member 15 for pressing the edge of the reflective display unit 13 is bolted to the seat member 14. This also applies to the outer rear door 10R.

Figure 14:
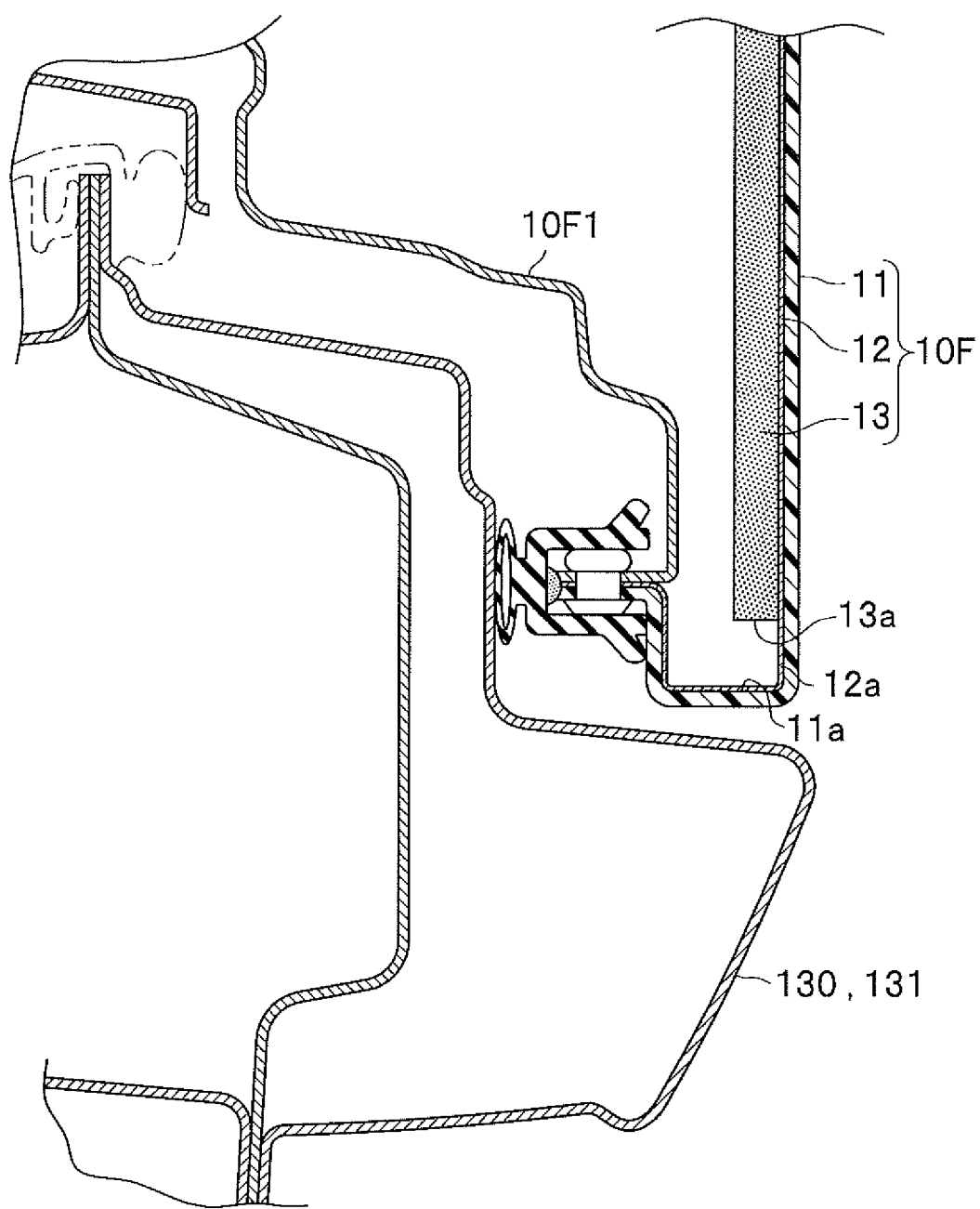
FIG. 14 is a cross-sectional view taken along a line XIV-XIV in FIG. 10 to schematically show a vehicle applied with the vehicular display system according to the fifth embodiment of the present invention.

Further, as shown in FIG. 14 which is a cross-sectional view taken along a line XIV-XIV in FIG. 10, the lower edge 13a of the reflective display unit 13 is positioned above the lower edge 11a of the transparent plate 11, in the outer front door 10F, for example, by 5 mm or more. This also applies to the outer rear door 10R.

As shown in FIG. 13, the vehicular display system 1E according to the fifth embodiment of the present invention has the floodlight 20 provided on a belt line of the outer front door 10F. The belt line is a lower edge (a lower frame extending in the front-rear direction) of an opening formed in the upper portion of the door so as to be opened and closed by a window W.

<Cover Member>

A cover member 90 is provided on the belt line of the outer front door 10F. The cover member 90 integrally includes an outer wall 90a, an upper wall 90b that extends inward in the vehicle width direction from the upper end of the outer wall 90a, and an inner wall 90c that extends downward from the inner end in the vehicle width direction of the upper wall 90b. Additionally, the cover member 90 includes a transparent plate 91 that is equivalent to the transparent plate 11 of the outer front door 10F, and a screen printing layer 92 that is formed on the inner surface of the transparent plate 91. The lower end of the screen printing layer 92 is formed with mirror surface ink, and the other portion of the screen printing layer 92 is formed in the same color as the opaque layer 12a of the screen printing layer 12 of the outer front door 10F.

<<Arrangement of Floodlight>>

Figure 15:
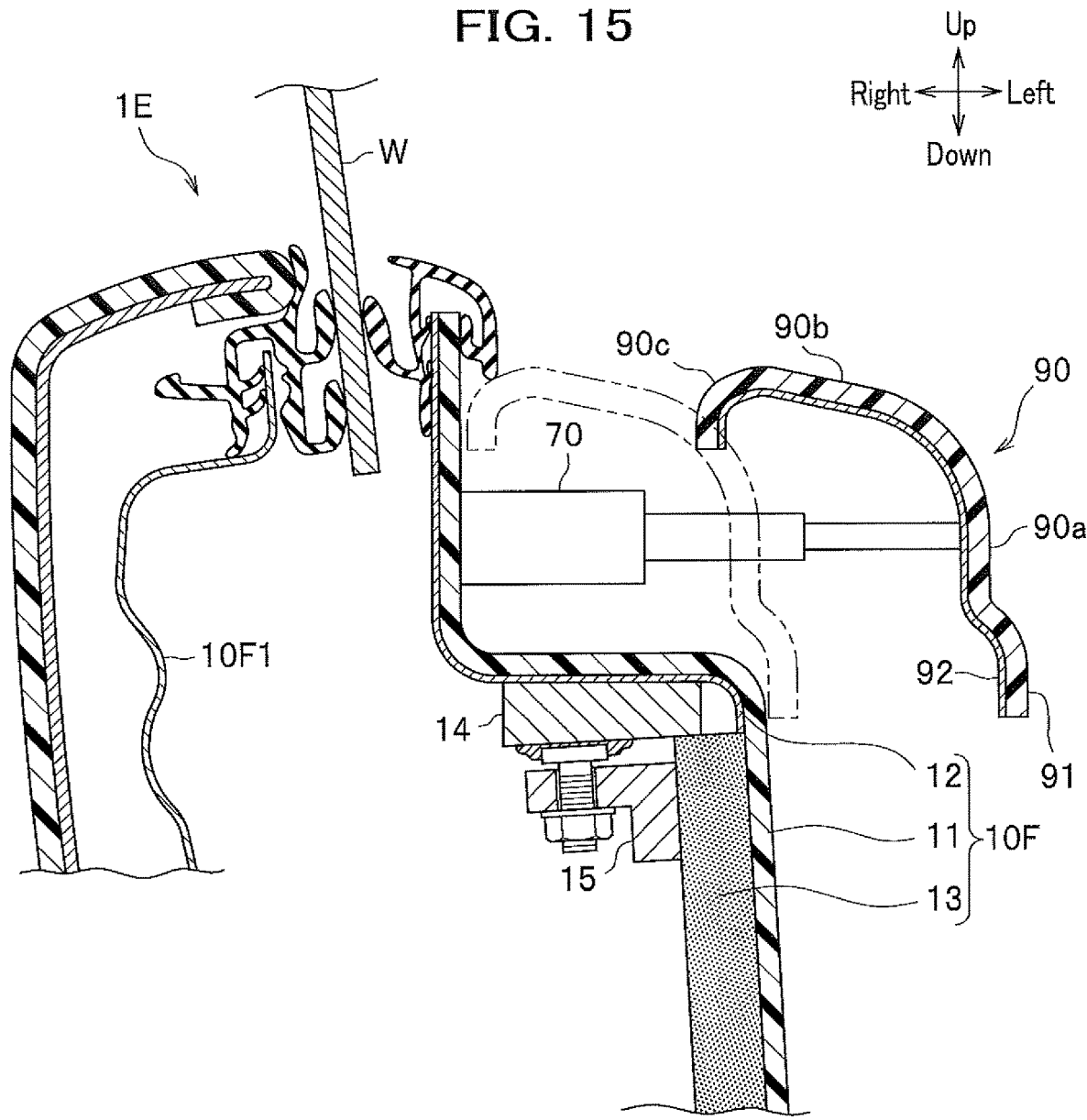
FIG. 15 is a cross-sectional view taken along a line XV-XV in FIG. 10 to schematically show a vehicle applied with the vehicular display system according to the fifth embodiment of the present invention.

In the present embodiment, the floodlight 20 is provided in the cover member 90. As shown in FIG. 15 which is a cross-sectional view taken along a line XV-XV in FIG. 10, the vehicular display system 1E includes the moving mechanism 70. The moving mechanism 70 is a piston mechanism installed between the upper end of the outer front door 10F and the outer wall 90a of the cover member 90, for example, and controlled by the controller 6 (see FIG. 1) to move the cover member 90 in the vehicle width direction. As shown in FIG. 13, the light source 23 of the floodlight 20 is capable of irradiating the reflective type display unit 13 with light from outside the vehicle and from obliquely above through the transparent cover 22 of the floodlight 20, the lower opening of the cover member 90, and the transparent plate 11, in a state that the cover member 90 is moved outward in the vehicle width direction.

Note that in the vehicular display system 1E, the outer rear door 10R is also surrounded by the same configuration as with the outer front door 10F.

The vehicular display system 1E according to the fifth embodiment of the present invention includes the vehicular outer panels 10F, 10R that constitute a door panel provided on the side wall in the vehicle width direction of the body, and has the light source 23 provided on the belt line of the vehicular outer panels 10F, 10R. Then, the vehicular display system 1E is capable of using the light source 23 during the night or the like to irradiate the reflective display unit 13 with light from above for suitably displaying an image or a video.

Sixth Embodiment

A description will be given of a vehicular display system according to a sixth embodiment of the present invention, focusing on differences from the vehicular display system 1E according to the fifth embodiment. As shown in FIG. 16 which is a cross-sectional view taken along a line XVI-XVI in FIG. 10, a vehicular display system 1F according to the sixth embodiment of the present invention has the floodlight 20 provided on a side sill 130F which is a part of the body panel 130.

<Side Sill>

The side sill 130F is a frame member made of metal that extends in the front-rear direction below the front door. The side sill 130F is formed by combining an outer side sill 130F1 with an inner side sill 130F2. The outer side sill 130F1 is bent so as to define a space between the lower edge of the front door and the outer side sill 130F1.

<Cover Member>

A cover member 100 is provided in this space. The cover member 100 is a member integrally including an upper wall 101, an outer wall portion 102 that extends downward from the outer end in the vehicle width direction of the upper wall 101, and a lower wall 103 that extends inward in the vehicle width direction from the lower end of the outer wall 102. The upper wall 101 is formed to have a light transmitting portion 101a (an opening portion, a window made of a transparent resin or the like).

<<Arrangement of Floodlight>>

Figure 17:
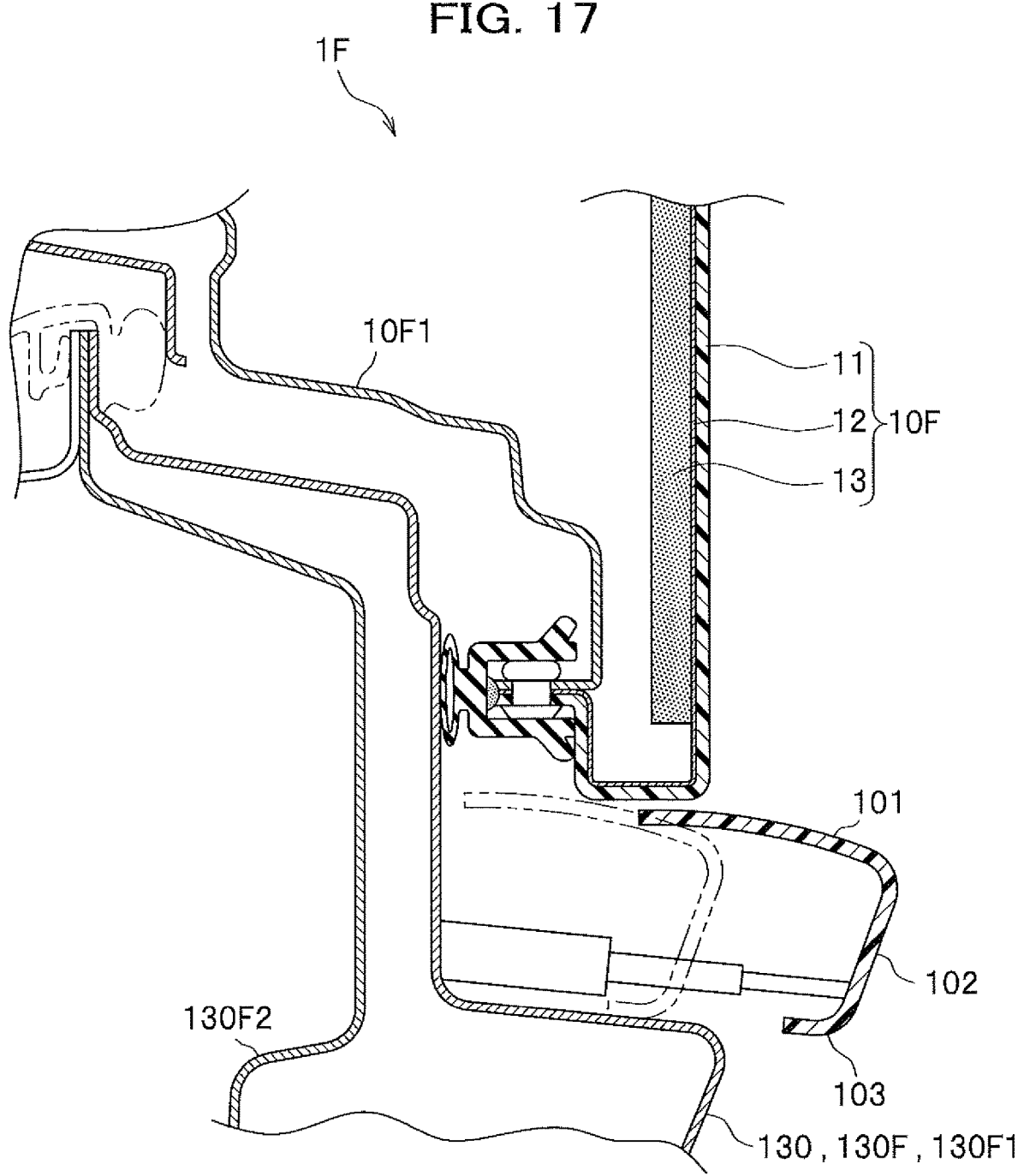
FIG. 17 is a cross-sectional view taken along a line XVII-XVII in FIG. 10 to schematically show a vehicle applied with the vehicular display system according to the sixth embodiment of the present invention.

In the present embodiment, the floodlight 20 is provided in the cover member 100. As shown in FIG. 17 which is a cross-sectional view taken along a line XVII-XVII in FIG. 10, the vehicular display system 1F includes the moving mechanism 70. The moving mechanism 70 is a piston mechanism that is installed between an inner bent portion of the outer side sill 130F and the outer wall 102 of the cover member 100, for example, and controlled by the controller 6 (see FIG. 1) to move the cover member 100 in the vehicle width direction. As shown in FIG. 15, the light source 23 of the floodlight 20 is capable of irradiating the reflective display unit 13 with light from outside the vehicle and from obliquely below through the transparent cover 22 of the floodlight 20, the light transmitting portion 101a of the cover member 100, and the transparent plate 11, in a state that the cover member 100 is moved outward in the vehicle width direction.

Note that in the vehicular display system 1F, the rear outer door 10R is also surrounded by the same configuration as with the outer front door 10F.

The vehicular display system 1F according to the sixth embodiment of the present invention has the vehicular outer panels 10F, 10R (or the vehicular display curtain, or the vehicular display convertible top) to constitute a side surface of the vehicle in the vehicle width direction, and has the light source 23 provided on the side sill 130F which is arranged below the vehicular outer panels 10F, 10R (or vehicular display curtain, or vehicular display convertible top). Then, the vehicular display system 1F is capable of using the light source 23 during the night or the like to irradiate the reflective display unit 13 with light from below for suitably displaying an image or a video.

Seventh Embodiment

A description will be given of a vehicular display system according to a seventh embodiment of the present invention, focusing on differences from the vehicular display system 1E according to the fifth embodiment. As shown in FIG. 10, a vehicular display system 1G according to the seventh embodiment of the present invention has the floodlight 20 provided in a door mirror 110. The light source 23 of the floodlight 20 is capable of irradiating the reflective display unit 13 with light from front through the transparent cover 22 of the floodlight 20 and the transparent plate 11. Note that the floodlight 20 may be provided in a rearview mirror, an imaging unit arranged in the body, or the like, other than the door mirror 110.

The vehicular display system 1G according to the seventh embodiment of the present invention has the vehicular outer panels 10F, 10R (or the vehicular display curtain, or the vehicular display convertible top) to constitute a side surface of the vehicle in the vehicle width direction, and has the light source 23 provided in the rearview mirror or the imaging unit which is arranged in front of the vehicular outer panels 10F, 10R (or a vehicular display curtain, or a vehicular display convertible top). Then, the vehicular display system 1G is capable of using the light source 23 during the night or the like to irradiate the reflective display unit 13 with light from front for suitably displaying an image or a video.

Eighth Embodiment

Figure 18:
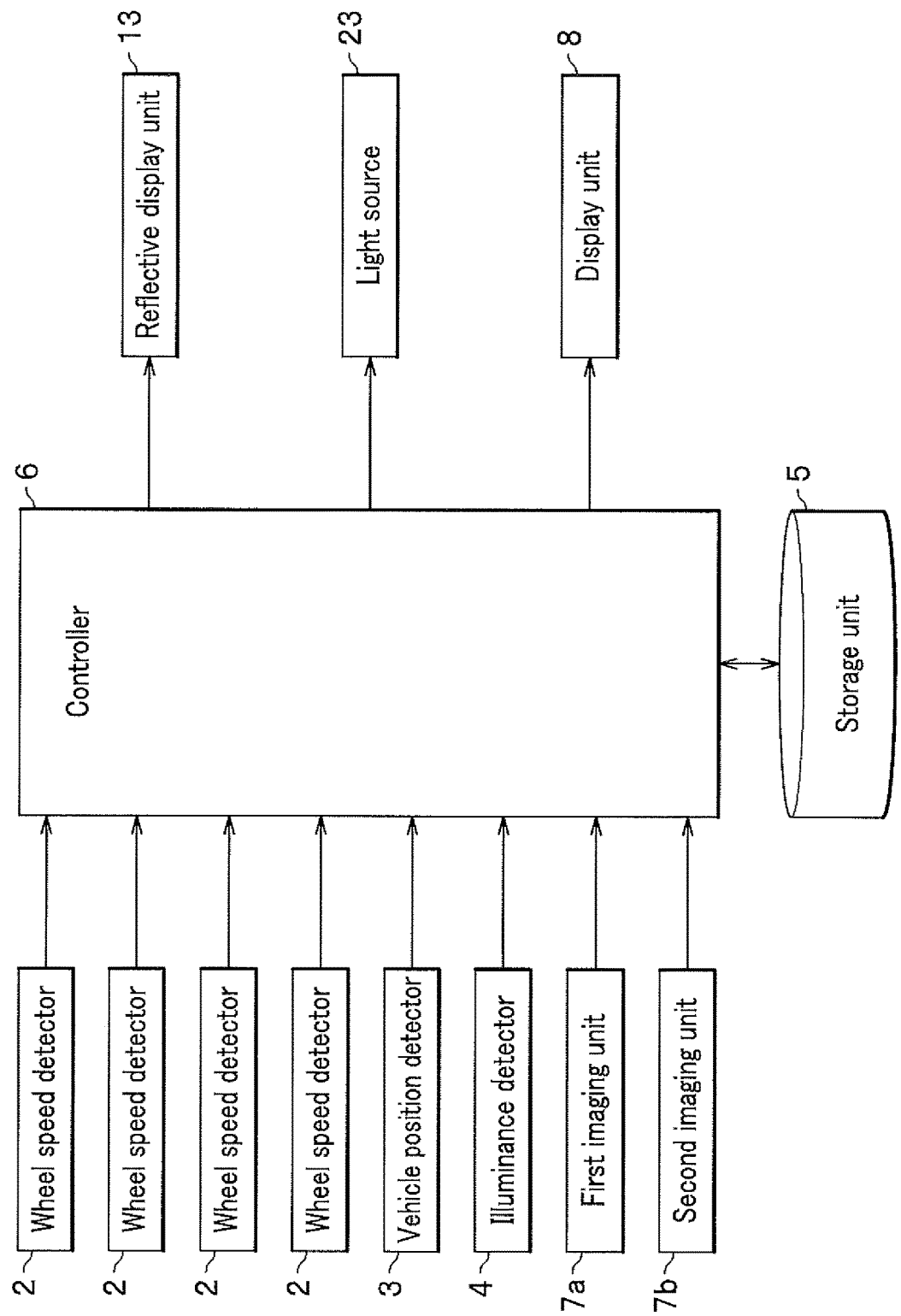
FIG. 18 is a block diagram schematically showing a vehicular display system according to an eighth embodiment of the present invention.

A description will be given of a vehicular display system according to an eighth embodiment of the present invention, focusing on differences from the vehicular display system 1A according to the first embodiment. As shown in FIG. 18, a vehicular display system 1H according to the eighth embodiment of the present invention includes a first imaging unit 7a, a second imaging unit 7b, and a display unit 8.

<Imaging Units>

The first imaging unit 7a is a camera (so-called rearview camera) that images a rearward view of the vehicle C and outputs an imaged result to the controller 6. The first imaging unit 7a is provided, for example, on the lower rear spoiler 41 of the rear spoiler 40 as shown in FIG. 19. The second imaging unit 7b is a camera (so-called blind-spot monitoring camera) that images (the ground in) a lower rearward view of the vehicle C and outputs an imaged result to the controller 6. The second imaging unit 7b is provided, for example, on the lower rear spoiler 41 of the rear spoiler 40, as shown in FIG. 20.

<Display Unit>

The display unit 8 is, for example, a monitor integrally provided on a rearview mirror which is arranged in a vehicle compartment of the vehicle C, a monitor for a car navigation system, or the like.

As shown in FIG. 21, the controller 6 controls the display unit 8 to display an imaged result X1 from the first imaging unit 7a and an imaged result X2 from the second imaging unit 7b. In the case where the display unit 8 is a monitor integrated with a rearview mirror, the controller 6 converts the imaged result X1 from the first imaging unit 7a to an image having the same angle of view as a view reflected in the rearview mirror and seen by the driver, and controls the display unit 8 to display it.

The vehicular display system 1H according to the eighth embodiment of the present invention has the vehicular outer panel 10 (or the vehicular display curtain, or the vehicular display convertible top) to constitute the rear surface of the vehicle, and includes: the imaging units 7a, 7b that image rearward views of the vehicle C; and a display unit 8 that is provided in a vehicle compartment of the vehicle C and displays imaged results from the imaging units 7a, 7b. Then, the vehicular display system 1H allows the driver to visually confirm conditions behind the vehicle C, even when the vehicular outer panel 10 constitutes the rear wall of the body, for example.

Ninth Embodiment

Figure 22A:
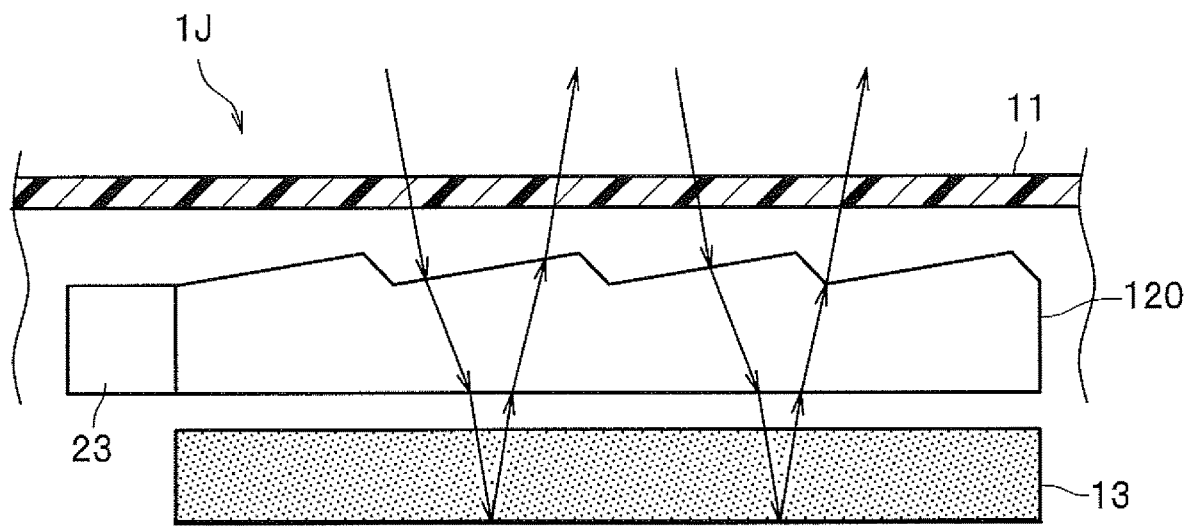
FIGS. 22A and 22B are cross-sectional views, each schematically showing a vehicular display system according to a ninth embodiment of the present invention, where
Figure 22B:
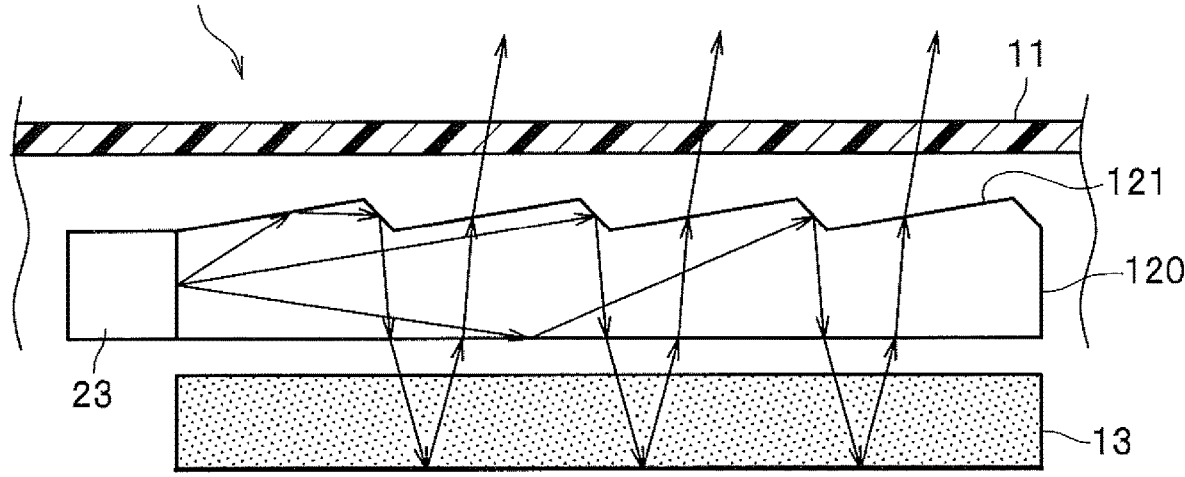

A vehicular display system according to a ninth embodiment of the present invention will be described. As shown in FIGS. 22A and 22B, a vehicular display system 1J according to a ninth embodiment of the present invention includes a light guide plate 120. The light guide plate 120 is interposed between the transparent plate 11 and the reflective display unit 13, and is formed of a transparent resin or the like, for example. An uneven surface 121 having a wavy shape toward a direction away from the light source 23 is formed on an outer surface, in the inside/outside direction of the vehicle, of the light guide plate 120. Note that the transparent plate 11, the light guide plate 120, and the reflective display unit 13 are illustrated In FIGS. 22A and 22B as being separated from each other, but the transparent plate 11, the light guide plate 120, and the reflective display unit 13 may be arranged so that adjacent ones abut each other.

The reflective display unit 13 and the light source 23 of the vehicular display system 1J according to the ninth embodiment are controlled by the controller 6, as in the vehicular display system 1A according to the first embodiment.

As shown in FIG. 22A, outside light such as direct sunlight enters the reflective display unit 13 via the transparent plate 11 and the light guide plate 120, during the day or the like, and then is reflected and exits to the outside of the vehicle via the light guide plate 120 and the transparent plate 11, to allow an image or a video displayed on the reflective display unit 13 to be suitably viewed by people outside the vehicle C.

As shown in FIG. 22B, light from the light source 23 enters the reflective display unit 13 via the light guide plate 120, during the night or the like, and then is reflected and exits to the outside of the vehicle via the light guide plate 120 and the transparent plate 11, to allow an image or a video displayed on the reflective display unit 13 to be suitably viewed by people outside the vehicle C.

The vehicular display system 1J according to the ninth embodiment of the present invention includes the light guide plate 120 interposed between the transparent plate 11 and the reflective display unit 13, wherein the light from outside the vehicle enters the reflective display unit 13 via the transparent plate 11 and the light guide plate 120, and then is reflected and exits to the outside of the vehicle via the light guide plate 120 and the transparent plate 11, while the light emitted from the light source 23 to the side surfaces of the light guide plate 120 enters the reflective display unit 13 via the light guide plate 120, and then is reflected and exits to the outside of the vehicle via the light guide plate 120 and the transparent plate 11. Then, the vehicular display system 1J allows the light source 23 to be arranged so as to be lateral to the light guide plate 120, reducing influence on the design property of the outer surface of the vehicle C.

Tenth Embodiment

A description will be given of a vehicular display window according to a tenth embodiment of the present invention, in a case where the vehicular display window is applied to a front window of the vehicle. As shown in FIG. 24 which is a cross-sectional view taken along a line XXIV-XXIV in FIG. 23, a vehicular display window 210 according to the tenth embodiment of the present invention constitutes an outer surface of the vehicle C, and includes a window 211, a black ceramic part 212, a reflective display unit 13, and a fixing member 213.

<<Window>>

The window 211 is a front window of the vehicle C, and is formed of transparent glass, resin (e.g., polycarbonate etc.), or the like.

<<Black Ceramic Part>>

The black ceramic part 212 is a layer formed on the periphery of an inner surface, in the inside/outside direction of the vehicle, of the window 211 by screen printing or the like using a black ceramic paint.

<<Reflective Display Unit>>

The reflective display unit 13 is provided on the inner surface, in the inside/outside direction of the vehicle, of the window 211 and is a member capable of displaying images for people outside the vehicle. In the present embodiment, the reflective display unit 13 may be provided over the entire surface of the window 211 or may be provided over a part thereof.

<<Fixing Member>>

The fixing member 213 is a member made of metal or resin that is provided by bonding or the like on an inner surface, in the inside/outside direction of the vehicle, of the black ceramic part 212. The fixing member 213 integrally includes a leg portion 213a that extends in a direction intersecting with the surface of the window 211, and a flange portion 213b that extends inward over the surface of the window 211 from a front end of the leg portion 213a. The base end of the leg portion 213a is fixed to the black ceramic part 212 via an adhesive layer (or sticking layer) 214. The flange portion 213b sandwiches and supports the reflective display unit 13 together with the window 211 via a cushioning material (e.g., foamed material of urethane resin) 215.

The reflective display unit 13 (and the light source 23 that irradiates the reflective display unit 13 with light) of the vehicular display window 210 according to the tenth embodiment is controlled by the controller 6, as in the vehicular display systems according to the above-described embodiments.

The vehicular outer panel (vehicular display window 210) according to the tenth embodiment of the present invention has the window 211 as a transparent plate. Then, the vehicular display window 210 may be applied, for example, to the vehicle C in automated driving to display an image or a video so as to be suitably viewed by people outside the vehicle C even outdoors under direct sunlight.

Eleventh Embodiment

Figure 25A:
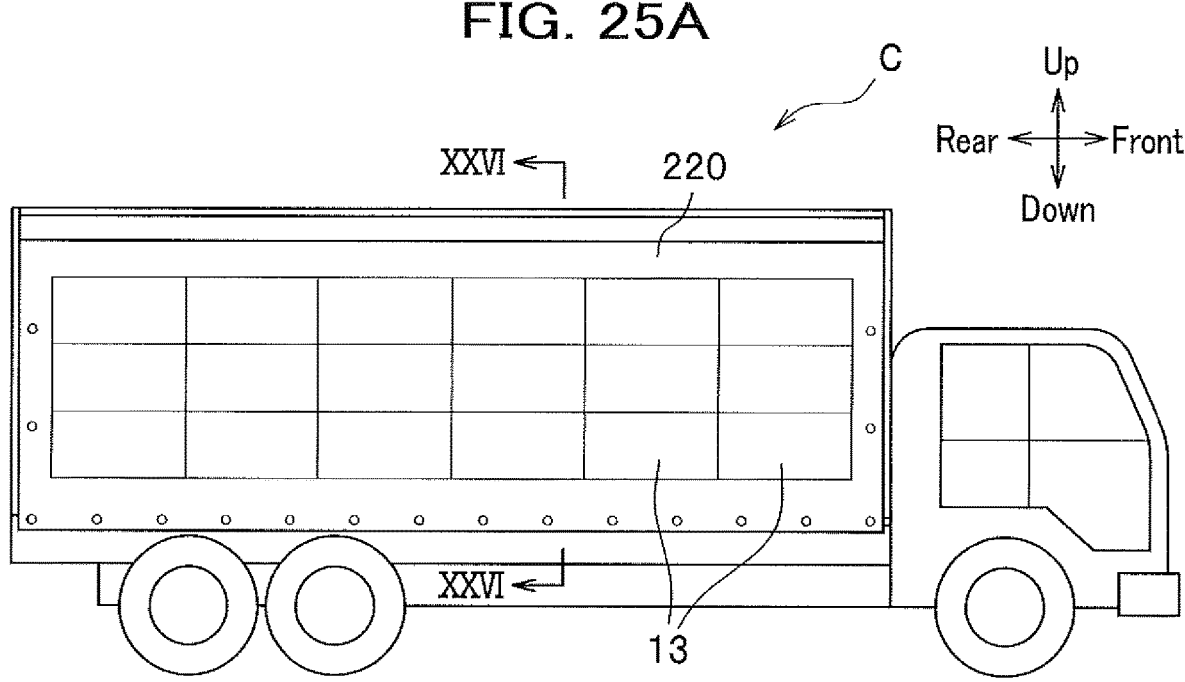
FIGS. 25A and 25B are side views, each schematically showing a vehicle applied with a vehicular display curtain according to a tenth embodiment of the present invention, where
Figure 25B:
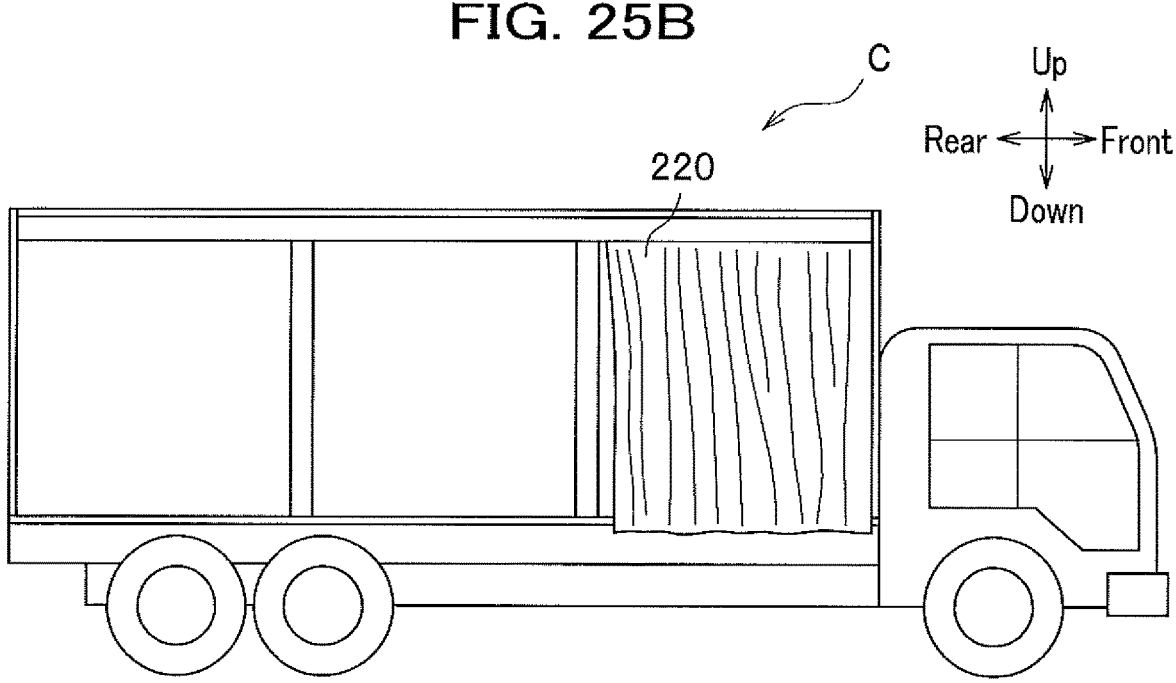
Figure 26:
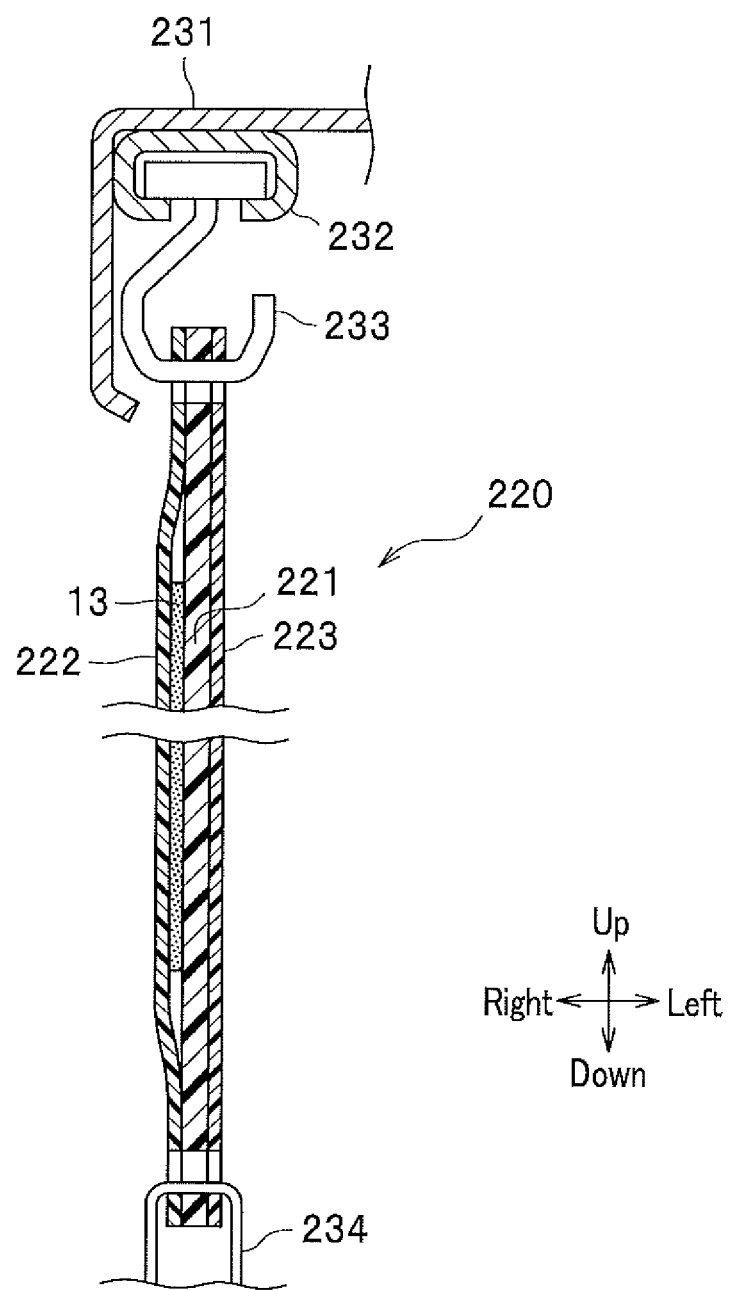
FIG. 26 is a cross-sectional view taken along a line XXVI-XXVI in FIG. 25A.

A vehicular display curtain according to an eleventh embodiment of the present invention will be described. As shown in FIGS. 25A and 25B, a vehicular display curtain 220 according to the eleventh embodiment of the present invention is provided so as to be opened and closed over a side opening of a container on a truck as the vehicle C to constitute an outer surface of the vehicle C. As shown in FIG. 26 which is a cross-sectional view taken along a line XXVI-XXVI in FIG. 25A, the vehicular display curtain 220 according to the eleventh embodiment of the present invention includes a curtain body (curtain) 221, the reflective display unit 13, and protective films 222, 223.

<<Curtain Body>>

The curtain body 221 is formed of flexible cloth, a flexible resin (e.g., PVC tarpaulin), or the like.

<<Reflective Display Unit>>

The reflective display unit 13 is provided on an outer surface, in the inside/outside direction of the vehicle, of the curtain body 221 and is a member capable of displaying images for people outside the vehicle. The reflective display unit 13 may be configured to combine two or more units depending on such as the size of the curtain body 221. In the present embodiment, the reflective display unit 13 is preferably a reflective electronic paper having flexibility.

<<Protective Films>>

The protective film 222 is provided on an outer surface, in the inside/outside direction of the vehicle, of the curtain body 221 and the reflective display unit 13 so as to sandwich and support the reflective display unit 13 with the curtain body 221. The protective film 222 has a waterproof function and the like for protecting the reflective display unit 13, and is formed of a transparent resin or the like, for example. The peripheral edge of the protective film 222 is fixed by bonding or the like to the peripheral edge of the curtain body 221.

The protective film 223 is provided on an inner surface, in the inside/outside direction of the vehicle, of the curtain body 221. The protective film 223 has waterproof and moisture permeating functions and the like, and is formed of a transparent resin or the like, for example. The protective film 223 is fixed by bonding or the like to the curtain body 221. The protective film 223 can be omitted.

An upper end of the vehicular display curtain 220 is attached to a hanger 233 that is slidable with respect to a rail 232 provided on a frame 231 of the container. Additionally, a lower end of the vehicular display curtain 220 can be attached to a lower end of the container by a rope 234 or the like. Note that the vehicular display curtain 220 can be installed so as to be opened and closed, or removed with respect to a side surface in the vehicle width direction, a rear surface, and an upper surface of the vehicle C.

The reflective display unit 13 (and the light source 23 that irradiates the reflective display unit 13 with light) of the vehicular display curtain 220 according to the eleventh embodiment is controlled by the controller 6, as in the vehicular display systems according to the above-described embodiments.

The vehicular display curtain 220 according to the eleventh embodiment of the present invention is attached to the vehicle C to configure an outer surface of the vehicle C, and includes: the curtain body 221; and the reflective display unit 13 that is arranged on an outer surface, in the inside/outside direction of the vehicle, of the curtain body 221 and is capable of displaying an image or a video for people outside the vehicle. Then, the vehicular display curtain 220 is capable of displaying an image or a video which is suitably viewed by people outside the vehicle C even outdoors under direct sunlight.

Twelfth Embodiment

Figure 27:
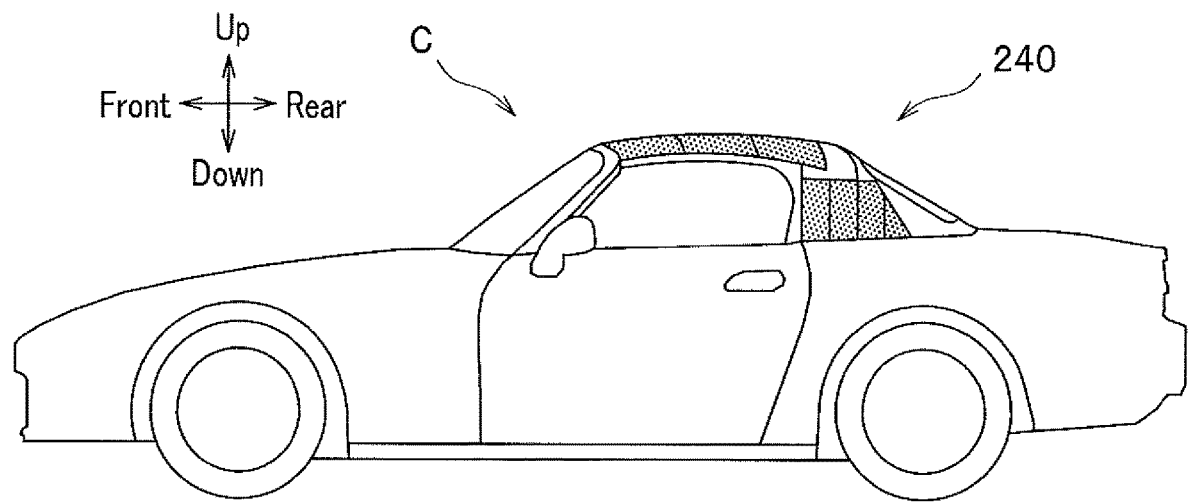
FIG. 27 is a side view to schematically show a vehicle applied with a vehicular display convertible top according to an eleventh embodiment of the present invention.
Figure 28:
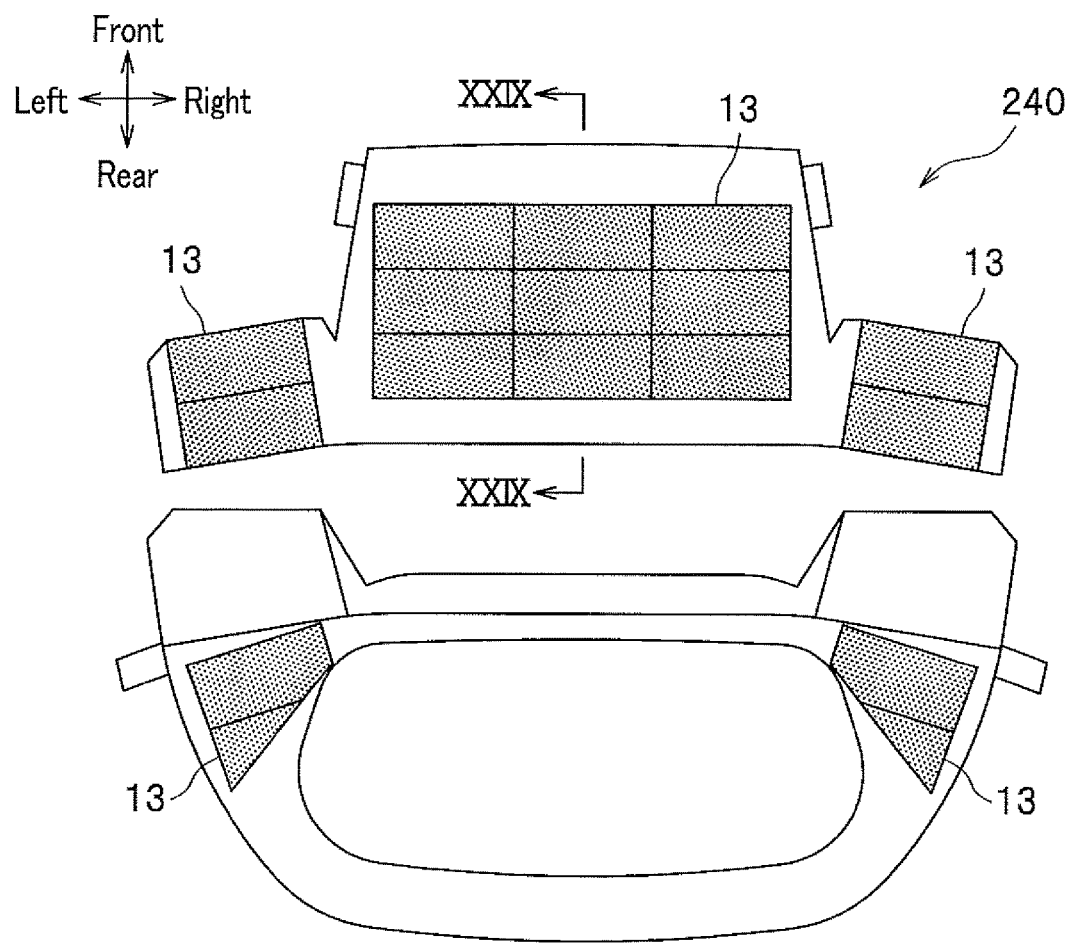
FIG. 28 is a developed view to schematically show a vehicular display convertible top according to the eleventh embodiment of the present invention.
Figure 29:
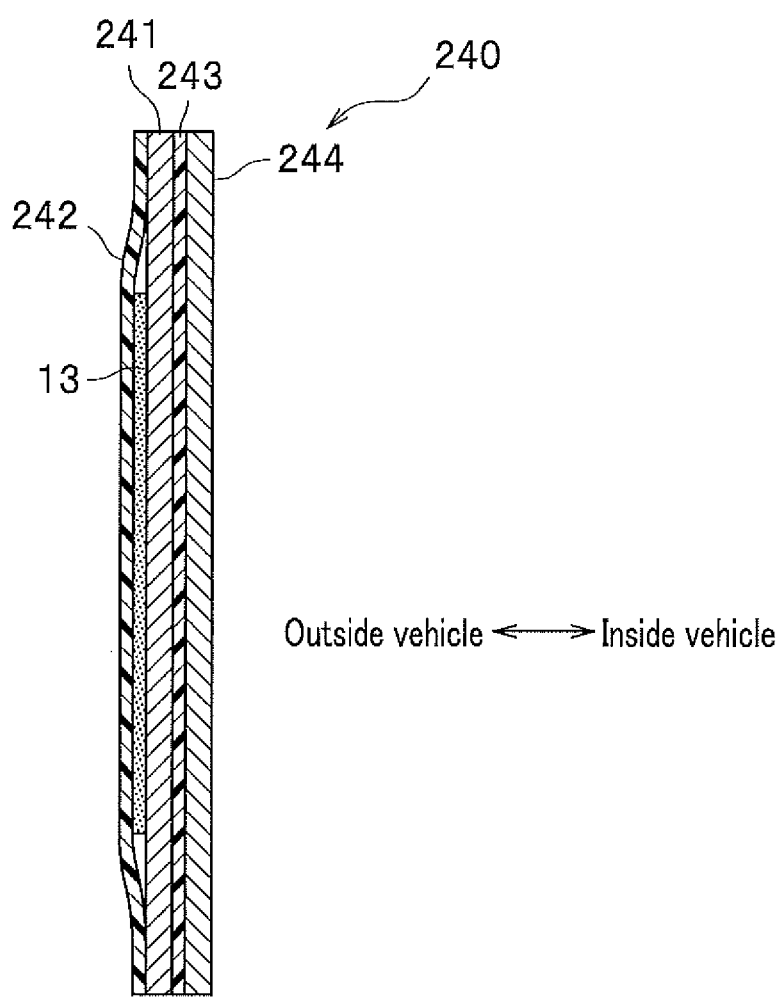
FIG. 29 is a cross-sectional view taken along a line XXIX-XXIX in FIG. 28.

A vehicular display convertible top according to a twelfth embodiment of the present invention will be described. As shown in FIGS. 27 and 28, a vehicular display convertible top 240 according to the twelfth embodiment of the present invention is composed of a part of a side surface in the vehicle width direction, a part of a rear surface, and an upper surface as outer surfaces of a convertible, as the vehicle C, so as to be opened and closed. As shown in FIG. 29 which is a cross-sectional view taken along a line XXIX-XXIX in FIG. 28, the vehicular display convertible top 240 according to the twelfth embodiment of the present invention includes a cover fabric 241, the reflective display unit 13, protective films 242 and 243, and a lining fabric 244.

<<Cover Fabric>>

The cover fabric 241 is formed of flexible cloth, flexible resin, or the like.

<<Reflective Display Unit>>

The reflective display unit 13 is provided on an outer surface, in the inside/outside direction of the vehicle, of the cover fabric 241 and is a member capable of displaying images for people outside the vehicle. The reflective display unit 13 is formed to combine two or more units depending on such as the size and a shape of the cover fabric 241. In the present embodiment, the reflective display unit 13 is preferably a reflective electronic paper having flexibility.

<<Protective Films>>

The protective film 242 is provided on an outer surface, in the inside/outside direction of the vehicle, of the cover fabric 241 and the reflective display unit 13 so as to sandwich and support the reflective display unit 13 with the cover fabric 241. The protective film 242 has a waterproof function and the like for protecting the reflective display unit 13, and is formed of a transparent resin or the like, for example. The peripheral edge of the protective film 242 is fixed by bonding or the like to the peripheral edge of the cover fabric 241.

The protective film 243 is provided on an inner surface, in the inside/outside direction of the vehicle, of the cover fabric 241. The protective film 243 has waterproof and moisture permeating functions and the like, and is formed of a transparent resin or the like, for example. The protective film 243 is fixed by bonding or the like to the cover fabric 241.

<<Lining Fabric>>

The lining fabric 246 is provided on an inner surface, in the inside/outside direction of the vehicle, of the protective film 243. The lining fabric 246 is formed of flexible cloth, flexible resin, or the like, as with the cover fabric 241. The lining fabric 246 is fixed by bonding or the like to the protective film 243.

The reflective display unit 13 (and the light source 23 that irradiates the reflective display unit 13 with light) of the vehicular display convertible top 240 according to the twelfth embodiment is controlled by the controller 6, as in the vehicular display systems according to the above-described embodiments.

The vehicular display convertible top 240 according to the twelfth embodiment of the present invention is attached to the vehicle C to configure an outer surface of the vehicle C, and includes the cover fabric 241 and the reflective display unit 13 that is arranged on an outer surface, in the inside/outside direction of the vehicle, of the cover fabric 241 and is capable of displaying an image or a video for people outside the vehicle. Then, the vehicular display convertible top 240 is capable of displaying an image or a video (e.g., a pattern desired by an occupant of the vehicle C such as a driver) which is suitably viewed by people outside the vehicle C even outdoors under direct sunlight.

Hereinabove, the embodiments of the present invention have been described, but the present invention is not limited thereto and can be appropriately modified within a scope not departing from the spirit of the present invention. For example, each of the embodiments can be appropriately combined with one another. In addition, the vehicular outer panel 10 may be configured to have a colored layer, other than the screen printing layer, arranged on a portion of the transparent plate 11 where the reflective display portion 13 is not provided.

The invention claimed is:

1. A vehicular display system comprising:
a display member selected from among:
a vehicular outer panel comprising:
a transparent plate that is attached to a vehicle and constitutes an outer wall of a vehicle body; and
a reflective display unit that is provided on an inner surface, in the inside/outside direction of the vehicle, of the transparent plate and is capable of displaying an image or a video for people outside the vehicle;
a vehicular display curtain, being attached to a vehicle to constitute an outer surface of the vehicle, comprising:
a curtain body; and
a reflective display unit that is provided on an outer surface, in the inside/outside direction of the vehicle, of the curtain body and is capable of displaying an image or a video for people outside the vehicle; and,
a vehicular display convertible top, being attached to a vehicle to constitute an outer surface of the vehicle, comprising:
a cover fabric; and
a reflective display unit that is provided on an outer surface, in the inside/outside direction of the vehicle, of the cover fabric and is capable of displaying an image or a video for people outside the vehicle; and
a light source that is capable of irradiating a display surface of the reflective display unit,
wherein
the selected display member constitutes a side surface in the vehicle width direction of the vehicle, and
the light source is provided in a rearview mirror or an imaging unit that is arranged in front of the selected display member.

2. The vehicular display system according to claim 1, wherein
the selected display member constitutes a rear surface of the vehicle, and further comprises:
an imaging unit that images a rearward view of the vehicle; and
a display unit that is provided in a vehicle compartment of the vehicle and displays an imaged result from the imaging unit.

3. The vehicular display system according to claim 1, further comprising:
an illuminance detector that detects an illuminance around the vehicle; and
a controller that controls the reflective display unit to display an image or a video on the reflective display unit, and controls the light source based on a detection result of the illuminance detector.

4. The vehicular display system according to claim 3 further comprising:
a vehicle position detector that detects a position the vehicle,
wherein the controller controls the reflective display unit based on a detection result of the vehicle position detector.

5. The vehicular display system according to claim 3, wherein
the controller controls the reflective display unit based on a speed of the vehicle.

6. A vehicular display system comprising:
a display member selected from among:
a vehicular outer panel comprising:
a transparent plate that is attached to a vehicle and constitutes an outer wall of a vehicle body; and
a reflective display unit that is provided on an inner surface, in the inside/outside direction of the vehicle, of the transparent plate and is capable of displaying an image or a video for people outside the vehicle;
a vehicular display curtain, being attached to a vehicle to constitute an outer surface of the vehicle, comprising:
a curtain body; and
a reflective display unit that is provided on an outer surface, in the inside/outside direction of the vehicle, of the curtain body and is capable of displaying an image or a video for people outside the vehicle; and,
a vehicular display convertible top, being attached to a vehicle to constitute an outer surface of the vehicle, comprising:
a cover fabric; and
a reflective display unit that is provided on an outer surface, in the inside/outside direction of the vehicle, of the cover fabric and is capable of displaying an image or a video for people outside the vehicle; and
a light source that is capable of irradiating a display surface of the reflective display unit,
wherein
the selected display member is the vehicular outer panel,
the vehicular outer panel constitutes a door panel that is provided on a side wall in the vehicle width direction of the vehicle body, and
the light source is provided on a belt line of the vehicular outer panel.

7. The vehicular display system according to claim 6, wherein
the transparent plate is a window.

8. The vehicular display system according to claim 7, wherein
a lower edge of the reflective display unit is positioned above a lower end of the transparent plate.

9. The vehicular display system according to claim 6, wherein
a lower edge of the reflective display unit is positioned above a lower end of the transparent plate.

* * * * *